United States Patent
Chang et al.

(10) Patent No.: US 8,928,683 B2
(45) Date of Patent: *Jan. 6, 2015

(54) PIXEL DATA CONVERSION APPARATUS AND METHOD FOR DISPLAY WITH DELTA PANEL ARRANGEMENT

(75) Inventors: Chih Kai Chang, Taichung (TW); Yu Li Wu, Hsinchu (TW)

(73) Assignee: Orise Technology Co., Ltd., Hsinchu (TW)

( * ) Notice: Subject to any disclaimer, the term of this patent is extended or adjusted under 35 U.S.C. 154(b) by 222 days.

This patent is subject to a terminal disclaimer.

(21) Appl. No.: 13/616,133

(22) Filed: Sep. 14, 2012

(65) Prior Publication Data

US 2013/0147805 A1    Jun. 13, 2013

(30) Foreign Application Priority Data

Dec. 7, 2011    (TW) .............................. 100145164 A

(51) Int. Cl.
*G09G 5/00* (2006.01)

(52) U.S. Cl.
USPC ........... 345/589; 345/597; 345/600; 345/603; 345/604

(58) Field of Classification Search
CPC ............... G09G 2340/06; G09G 2340/0407; G09G 2340/0414; G09G 2340/0421; G09G 2340/0492; G09G 3/2003; G09G 5/02; G09G 2320/0242; G09G 3/3607; G09G 3/3611; G09G 5/005

USPC .......................... 345/589, 597, 600, 603, 604
See application file for complete search history.

(56) References Cited

U.S. PATENT DOCUMENTS

| | | | |
|---|---|---|---|
| 7,176,940 B2 | 2/2007 | Choe et al. | |
| 7,248,234 B2 | 7/2007 | Hashimoto et al. | |
| 8,547,394 B2 * | 10/2013 | Swic et al. | 345/605 |
| 8,548,063 B2 * | 10/2013 | Klebanov et al. | 375/240.26 |
| 2005/0285855 A1 * | 12/2005 | Chien et al. | 345/419 |
| 2007/0229422 A1 | 10/2007 | Hung | |

* cited by examiner

*Primary Examiner* — Ke Xiao
*Assistant Examiner* — Kim-Thanh T Tran
(74) *Attorney, Agent, or Firm* — Bacon & Thomas, PLLC

(57) ABSTRACT

A pixel data conversion method for display with delta panel arrangement converts an input video signal into a temporary video signal which is a first RGB signal with 960 horizontal resolution in strip panel arrangement and converts the temporary video signal into an output video signal which is a RGB signal with 320 horizontal resolution in delta panel arrangement. Each line of the output video signal has 960 pixels, wherein a sequence of red pixel, green pixel, and blue pixel is repeatedly arranged for an odd-numbered horizontal line, and a sequence of green pixel, blue pixel, and red pixel is repeatedly arranged for an even-numbered horizontal line. The position of each pixel in an even-numbered horizontal line has a half-pixel dislocation to the position of each pixel in an odd-numbered horizontal line.

23 Claims, 15 Drawing Sheets

PIXEL DATA CONVERSION APPARATUS
AND METHOD FOR DISPLAY WITH DELTA
PANEL ARRANGEMENT

CROSS REFERENCE TO RELATED APPLICATION

This application claims the benefits of the Taiwan Patent Application Serial Number 100145164, filed on Dec. 7, 2011, the subject matter of which is incorporated herein by reference.

BACKGROUND OF THE INVENTION

1. Field of the Invention

The present invention relates to the technical field of display panels and, more particularly, to a pixel data conversion method and apparatus for display with delta panel arrangement.

2. Description of Related Art

Current consumer electronics are typically equipped with a liquid crystal display (LCD) panel as a human-machine interface for providing convenient viewing to a user. Generally, the LCD panels include two types, including strip panels and delta panels.

The strip panel is typically a large panel used in a notebook, for example. FIG. 1 is a schematic diagram of a typical strip panel. On the strip panel 100, each pixel 110, 120 has a red subpixel R, a green subpixel G, and a blue subpixel B, and the three-color subpixels of each pixel generate a different brightness, respectively, for being mixed into various colors.

The strip panel 100 includes multiple horizontal lines, and a display controller (not shown) provides color data to the red, green, blue subpixels R, G, B of each pixel, respectively. When the strip panel 100 has a resolution of 720×480, it indicates that the strip panel 100 has 480 horizontal lines having 720 pixels respectively, where a pixel has three color subpixels, i.e., red, green, and blue subpixels.

The strip panel 100 is based on the control of the pixel clock to concurrently receive the color data for updating the red, green, blue subpixels of a special pixel each time and further displaying different brightness respectively, so as to mix them into various colors. When all pixels of the panel are updated by controlling the scan lines in one-by-one manner, a complete frame is shown on the strip panel 100.

FIG. 2 is a timing diagram of color data and pixel clock for the strip panel 100 of FIG. 1. When an external video signal (such as an analog or digital TV video signal) is displayed by the strip panel 100, the image processing circuit (not shown) processes and samples the external video signal and further generates a pixel clock, a red data, a green data, a blue data. The red data, the green data, and the blue data are outputted by a red data line, a green data line, and a blue data line of the image processing circuit, respectively. The data sizes of the red, green, blue data can indicate a brightness of color unit respectively. Namely, the red, green, blue data corresponding to the rising edge of the first pixel clock can drive the three color subpixels of the first pixel, and the red, green, blue data corresponding to the rising edge of the second pixel clock can drive the three color subpixels of the second pixel, and so on. For an example of the strip panel 100 with a resolution of 720×480, the red, green, blue data corresponding to the first 720 pixels indicate the color data corresponding to the three color subpixels in all pixels of the first horizontal line. Similarly, after the 720×480 pixel clocks, the color units in all pixels of the entire strip panel 100 can receive a color data respectively to complete the update, so as to display a complete image on the panel.

Typically, when considering the compactness of the pixel points, a small panel (such as a car display panel) uses a delta panel. FIG. 3 is a schematic diagram of a typical delta panel 300. For a delta panel 300, each pixel 310, 320, 330 has only one color pixel, which is surrounded by other color pixels, and the horizontal lines are arranged in interlacing to one another. The three color units (as indicated by a triangle in FIG. 3) consisting of a combination of three pixels generate different brightness respectively for being mixed into various colors.

When the delta panel 300 has a resolution of 320×480, also written as 320RGB×480, it indicates that the delta panel 300 has 480 horizontal lines having 960 pixels respectively. A sequence of red pixel R, green pixel G, and blue pixel B is repeatedly arranged for an odd-numbered horizontal line, and a sequence of green pixel G, blue pixel B, and red pixel R is repeatedly arranged for an even-numbered horizontal line. The position of each pixel in an even-numbered horizontal line has a half-pixel dislocation to the position of each pixel in an odd-numbered horizontal line.

If the strip panel 100 of FIG. 1 has an image to be displayed with a resolution of M×N as same as the delta panel 300 of FIG. 3, the data line signal and pixel clock generated by the image processing circuit, as shown in FIG. 2, are not suitable for the delta panel 300 of FIG. 3. Thus, a complicated control circuit has to be added between the typical image processing circuit and the delta panel 300 of FIG. 3 in order to appropriately convert the color data and pixel clock generated by the image processing circuit before sending to the delta panel 300.

According to the specification of the delta panel 300, each color unit has a respective color clock and color data line, including a red clock Clk_3/R and red data line, a green clock Clk_1/G and green data line, and a blue clock Clk_2/B and blue data line. FIG. 4 is a timing diagram of color data of data lines and associated pixel clocks that are converted by a typical control circuit. Generally, the typical control circuit has a clock generator to process the pixel clock and further generate three color clocks (red clock, green clock, blue clock) with one third of a frequency from the pixel clock. As depicted in the red data, green data, blue data of FIG. 4, only one third of the M×N color data is selected and displayed. Namely, the first, fourth, seventh, and tenth red data are displayed, and the time of three pixel clocks is maintained.

By comparing FIG. 2 with FIG. 4, it is known that the first RGB data is displayed, and the second RGB data and the third RGB data are not outputted for display. Similarly, the fourth, the seventh, the tenth RGB data are outputted for display, and the other RGB data are not outputted for display. When the three color clocks are at the rising edges (indicated by the arrows), the corresponding red data, green data, and blue data are displayed on the panel.

Taking the first row of pixels as an example, in the previous M pixel clocks, the rising edge of the first red clock is synchronous with the first pixel clock in order to present the first color data of the red data line at the position of the first pixel. Similarly, the rising edge of the first green clock is synchronous with the second pixel clock in order to present the first color data of the green data line at the position of the second pixel, the rising edge of the first blue clock is synchronous with the third pixel clock in order to present the first color data of the blue data line at the position of the third pixel, and so on. After the M×N pixel clocks are generated, a complete image is displayed on the entire delta panel 300.

Obviously, the typical control circuit reduces the desired resolution after the signal conversion. For example, the delta panel 300 has a resolution of M×N as same as the strip panel 100, but its actually present resolution is only one third of the strip panel. That is, some details of the desired image cannot be present due to the resolution reduction.

In U.S. Patent Publication No. 2007/0229422, described a clock duplicating circuit 40 for receiving a pixel clock outputted by an image processing circuit to thereby generate three color clocks with a frequency of one third of the pixel clock and a duty cycle of 50%. In this case, a clock adjusting device 50 is used to receive the three clocks generated by the clock duplicating circuit 40 in order to adjust each of the three clocks, so that there is a phase difference of 120 degrees between every two of the clocks, and then the three adjusted clocks, i.e., a green clock Clk_1/G, a blue clock Clk_2/B, and a red clock Clk_3/R, are outputted. The color data line 31 of the image processing circuit directly acts as the color data (i.e., green, blue, red data) on the horizontal lines of the delta panel for improving the frame quality.

FIG. 5 is a timing diagram of color data and associated pixel clocks for horizontal lines of a typical delta panel disclosed in the U.S. Patent Publication No. 2007/0229422. FIG. 6 schematically illustrates a relationship between three color subpixels of the strip panel and pixels of the delta panel. As shown in FIG. 6, the color data of the strip panel 100 directly acts as the color data (i.e., green, blue, red data) of scan or horizontal lines of the delta panel 300. Namely, one of the three color subpixels at the position of a pixel from the strip panel is extracted and displayed as a pixel of the delta panel at the same position. However, such a conventional pixel data conversion does not consider that the position of each pixel in an even-numbered horizontal line has a half-pixel dislocation to the position of each pixel in an odd-numbered horizontal line, resulting in that the defects of zigzag edges, line deformation, or color fringing typically present in displaying on the delta panel. Therefore, it is desirable to provide an improved pixel data conversion to mitigate and/or obviate the aforementioned problems.

SUMMARY OF THE INVENTION

The object of the present invention is to provide a pixel data conversion method and apparatus for display with delta panel arrangement, which can avoid the problems of zigzag edges, line deformation, or color fringing that are typically present in displaying on the delta panel, so as to improve the frame quality effectively.

According to a feature of the invention, a pixel data conversion apparatus for display with delta panel arrangement is provided, which includes a first color domain converter, a determinator, a first one dimension (1D) scaler, a second 1D scaler, a second color domain converter, and a low pass filtering mapper. The first color domain converter converts an input video signal from an RGB into a YCrCb domain to thereby generate a first YCrCb signal. The determinator is connected to the first color domain converter in order to determine a horizontal resolution of the first YCrCb signal. When the first YCrCb signal is of a first horizontal resolution (720), a first enable signal is generated. When the first YCrCb signal is of a second horizontal resolution (640), a second enable signal is generated. The first 1D scaler is connected to the determinator in order to scale the first YCrCb signal to become a second YCrCb signal with a third horizontal resolution (960) when the first enable signal is activated. The second 1D scaler is connected to the determinator in order to scale the first YCrCb signal to become the second YCrCb signal with the third horizontal resolution (960) when the second enable signal is activated. The second color domain converter is connected to the first 1D scaler and the second 1D scaler in order to convert the second YCrCb signal with the third horizontal resolution (960) into an RGB signal with the third horizontal resolution (960). The low pass filtering mapper is connected to the second color domain converter in order to filter and map the RGB signal with the third horizontal resolution (960) into an RGB signal with a fourth horizontal resolution (320). The third horizontal resolution is a triple of the fourth horizontal resolution.

According to another feature of the invention, a pixel data conversion method for display with delta panel arrangement is provided. The method includes: (A) converting an input video signal from an RGB into a YCrCb domain to thereby generate a first YCrCb signal; (B) determining a horizontal resolution of the first YCrCb signal, and generating a first enable signal when the first YCrCb signal is of a first horizontal resolution and a second enable signal when the first YCrCb signal is of a second horizontal resolution; (C) scaling the first YCrCb signal to become a second YCrCb signal with a third horizontal resolution when the first enable signal is activated; (D) scaling the first YCrCb signal to become the second YCrCb signal with the third horizontal resolution when the second enable signal is activated; (E) Converting the second YCrCb signal with the third horizontal resolution into an RGB signal with the third horizontal resolution, wherein the RGB signal with the third horizontal resolution is in a strip panel arrangement with a resolution of 960RGB×480 and has 480 horizontal lines in a frame, with 960 pixels in every horizontal line and three subpixels in every pixel that are red, green, and blue subpixels; and (F) filtering and mapping the RGB signal with the third horizontal resolution into an RGB signal with a fourth horizontal resolution, wherein the RGB signal with the fourth horizontal resolution is in a delta panel arrangement with a resolution of 320RGB×480 and has 480 horizontal lines in a frame, with 960 pixels in every horizontal line, repeatedly arranged in a sequence of red, green, blue pixels for every odd number horizontal line and in a sequence of green, blue, red pixels for every even number horizontal line. The position of each pixel in an even number horizontal line has a half-pixel dislocation to the position of each pixel in an odd number horizontal line.

Other objects, advantages, and novel features of the invention will become more apparent from the following detailed description when taken in conjunction with the accompanying drawings.

DETAILED DESCRIPTION OF THE PREFERRED EMBODIMENT

Figure 7:
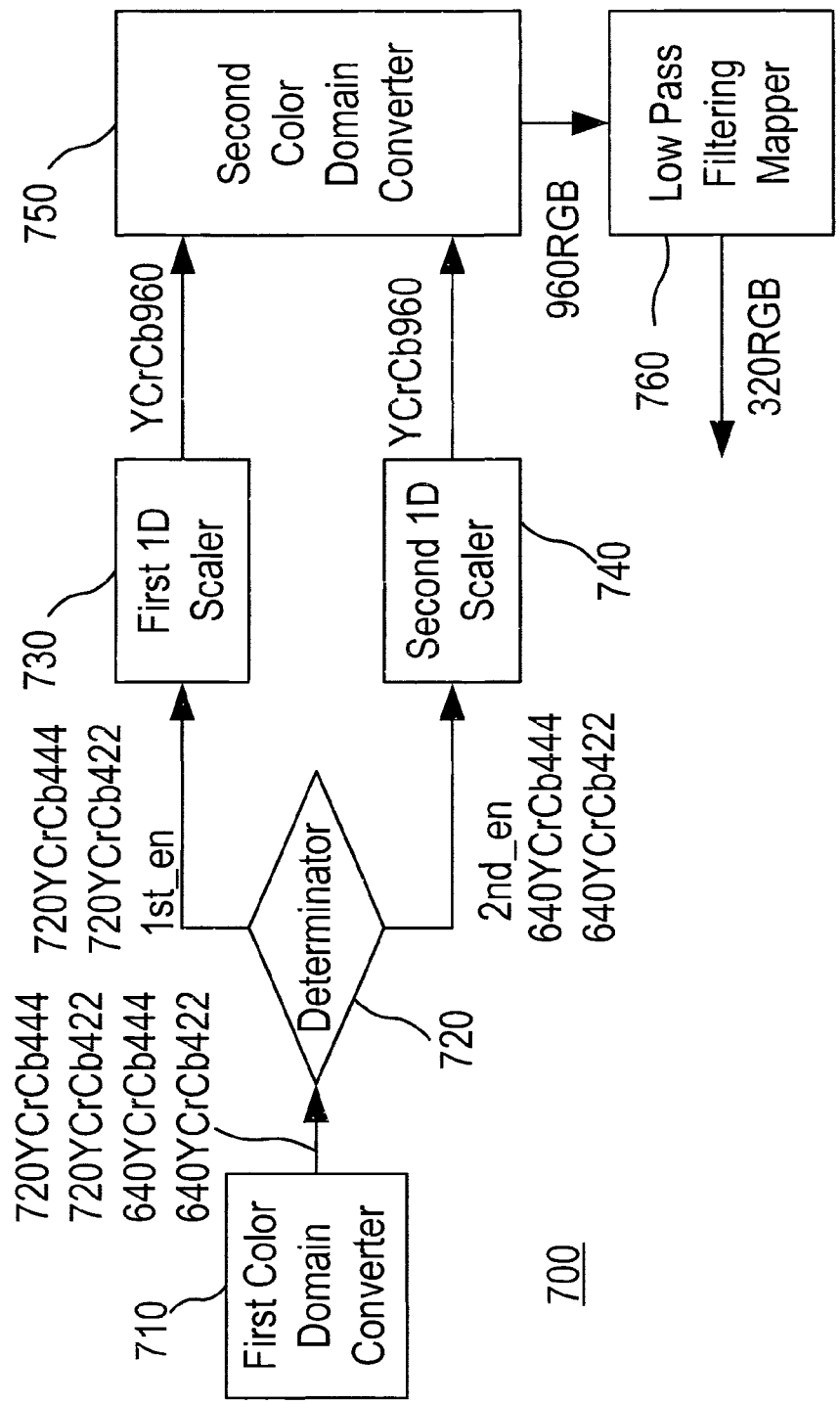
FIG. 7 is a block diagram of a pixel data conversion apparatus for display with delta panel arrangement according to an embodiment of the invention.

FIG. 7 is a block diagram of a pixel data conversion apparatus 700 for display with delta panel arrangement according to an embodiment of the invention. In FIG. 7, the apparatus 700 includes a first color domain converter 710, a determinator 720, a first one-dimension (1D) scaler 730, a second one-dimension scaler 740, a second color domain converter 750, and a low pass filtering mapper 760.

The first color domain converter 710 converts an input video signal from an RGB into a YCrCb domain so as to generate a first YCrCb signal. In this application, the input video signal is described in an example of 720RGB×480 and 640RGB×480, and those who skilled in the art can develop other input video signal formats based on the description of the present invention.

When the input video signal is 720RGB×480, the first YCrCb signal outputted by the first color domain converter 710 can be a 720YCrCb444 or 720YCrCb422 format. When the input video signal is 640RGB×480, the first YCrCb signal outputted by the first color domain converter 710 can be a 640YCrCb444 or 640YCrCb422 format.

The determinator 720 is connected to the first color domain converter 710 in order to determine a horizontal resolution of the first YCrCb signal. When the first YCrCb signal is a first horizontal resolution (720), a first enable signal 1 st_en is generated. When the first YCrCb signal is a second horizontal resolution (640), a second enable signal 2nd_en is generated.

The first one-dimension scaler 730 is connected to the determinator 720 in order to scale the first YCrCb signal to become a second YCrCb signal YCrCb960 with a third horizontal resolution (960) when the first enable signal is activated (true).

Figure 8:
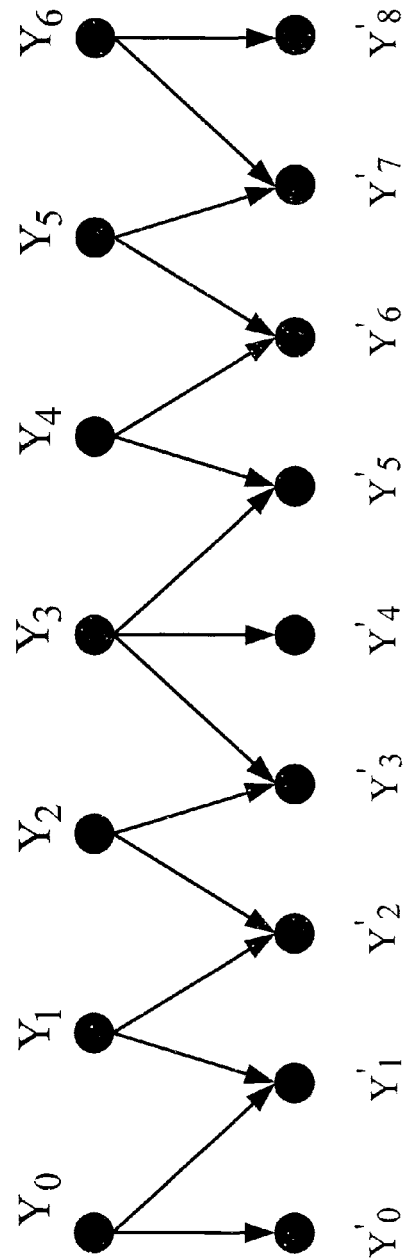
FIG. 8 is a schematic diagram of generating a luma by a first one-dimension scaler when a first YCrCb signal has a 720YCrCb444 format according to an embodiment of the invention.

When the first YCrCb signal is in the 720YCrCb444 or 720YCrCb422 format, the first one-dimension scaler 730 is enabled. FIG. 8 is a schematic diagram of generating a luma Y by the first one-dimension scaler 730 when the first YCrCb signal is in the 720YCrCb444 format. In this case, the first one-dimension scaler 730 can be expressed as follows:

$Y'_k = Y_{k/4*3}$, $Y'_{k+1} = 1/4 * Y_{(k/4*3)} + 3/4 * Y_{(k/4*3+1)}$, $Y'_{k+2} = 1/2 * Y_{(k/4*3+1)} + 1/2 * Y_{(k/4*3+2)}$, and $Y'_{k+3} = 3/4 * Y_{(k/4*3+2)} + 1/4 * Y_{(k/4*3+3)}$, where k is four times an integer, preferably k=0, 4, 8, 12, . . . ; $Y_{k/4*3}, Y_{(k/4*3+1)}, Y_{(k/4*3+2)}, Y_{(k/4*3+3)}$ are lumas of the first YCrCb signal; $Y'_k, Y'_{k+1}, Y'_{k+2}, Y'_{k+3}$ are lumas of the second YCrCb signal YCrCb960 with the third horizontal resolution (960).

Figure 9:
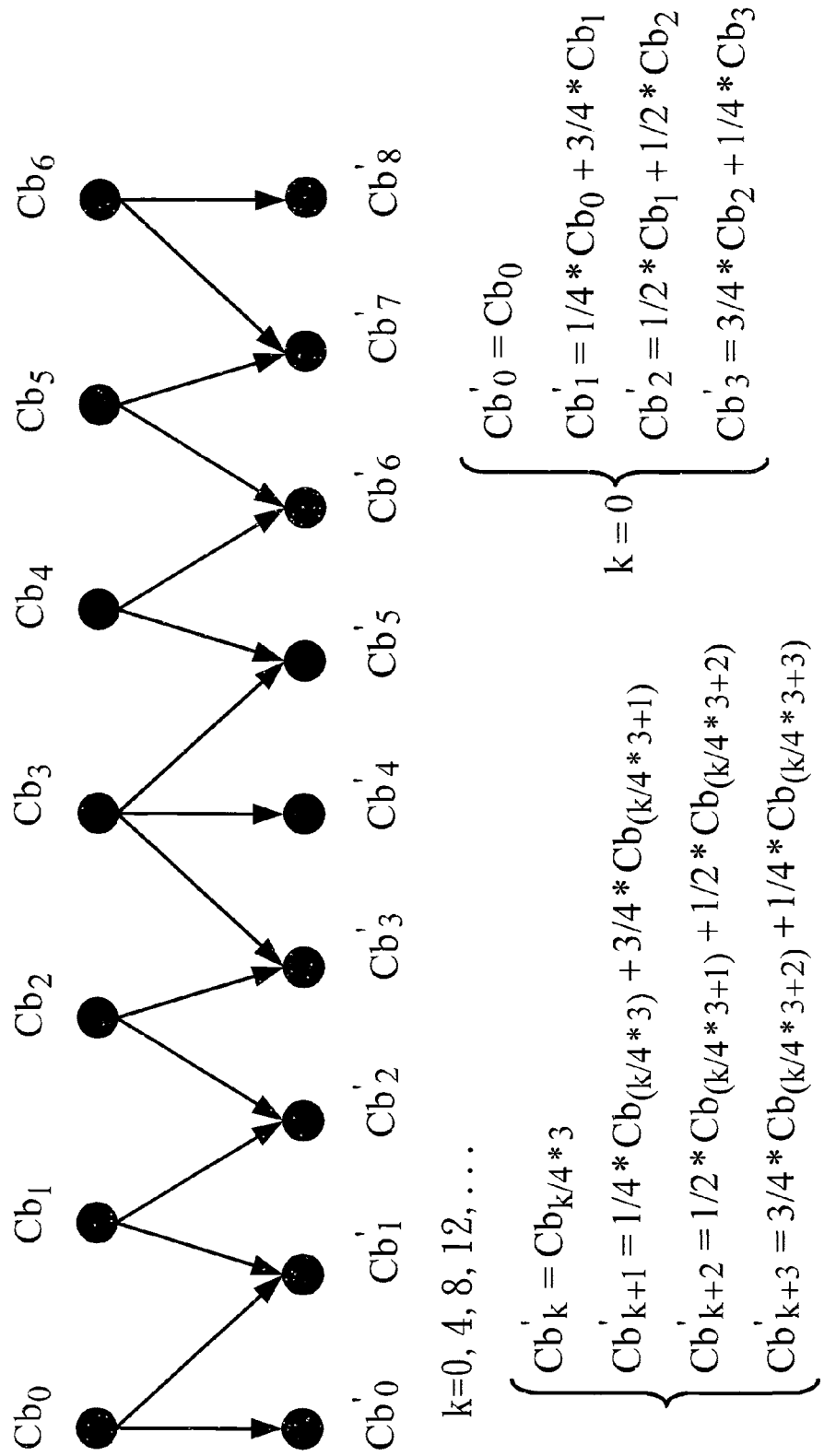
FIG. 9 is a schematic diagram of generating chromas Cr, Cb by a first one-dimension scaler when a first YCrCb signal has a 720YCrCb444 format according to an embodiment of the invention.

FIG. 9 is a schematic diagram of generating chromas Cr, Cb by the first one-dimension scaler 730 when the first YCrCb signal is in the 720YCrCb444 format. For example, for a chroma Cb, the first one-dimension scaler 730 can be expressed as follows:

$Cb'_k = Cb_{k/4*3}$, $Cb'_{k+1} = 1/4 * Cb_{(k/4*3)} + 3/4 * Cb_{(k/4*3+1)}$, $Cb'_{k+2} = 1/2 * Cb_{(k/4*3+1)} + 1/2 * Cb_{(k/4*3+2)}$, and $Cb'_{k+3} = 3/4 * Cb_{(k/4*3+2)} + 1/4 * Cb_{(k/4*3+3)}$, where k is four times an integer, preferably k=0, 4, 8, 12, . . . ; $Cb_{k/4*3}, Cb_{(k/4*3+1)}, Cb_{(k/4*3+2)}, Cb_{(k/4*3+3)}$ are chromas of the first YCrCb signal; $Cb'_k, Cb'_{k+1}, Cb'_{k+2}, Cb'_{k+3}$ are chromas of the second YCrCb signal YCrCb960 with the third horizontal resolution (960). For a chroma Cr, the first one-dimension scaler 730 can be expressed as follows:

$Cr'_k = Cr_{k/4*3}$, $Cr'_{k+1} = 1/4 * Cr_{(k/4*3)} + 3/4 * Cr_{(k/4*3+1)}$, $Cr'_{k+2} = 1/2 * Cr_{(k/4*3+1)} + 1/2 * Cr_{(k/4*3+2)}$, and $Cr'_{k+3} = 3/4 * Cr_{(k/4*3+2)} + 1/4 * Cr_{(k/4*3+3)}$, where k is four times an integer, $Cr_{k/4*3}, Cr_{(k/4*3+1)}, Cr_{(k/4*3+2)}, Cr_{(k/4*3+3)}$ are chromas of the first YCrCb signal, and $Cr'_k, Cr'_{k+1}, Cr'_{k+2}, Cr'_{k+3}$ are chromas of the second YCrCb signal with the third horizontal resolution.

When the first YCrCb signal is in the 720YCrCb422 format, the lumas and the chromas can be obtained from the equations used in FIGS. 8 and 9, except that the first YCrCb signal has a chroma expressed by $Cb_{2*w} = Cb_{2*w+1}$, where w is an integer and w≥0, i.e., $Cb_0 = Cb_1, Cb_2 = Cb_3 \ldots Cb_{718} = Cb_{719}$, and so on. Likewise, the chroma Cr, which is expressed as $Cr_{2*w} = Cr_{2*w+1}$ similar to the chroma Cb, can be obtained from the equations used in FIGS. 8 and 9 by those who skilled in the art, and thus a detailed description is deemed unnecessary.

The second one-dimension scaler 740 is connected to the determinator 720 in order to scale the first YCrCb signal to become the second YCrCb signal YCrCb960 with the third horizontal resolution (960) when the second enable signal 2nd_en is activated (true).

Figure 10:
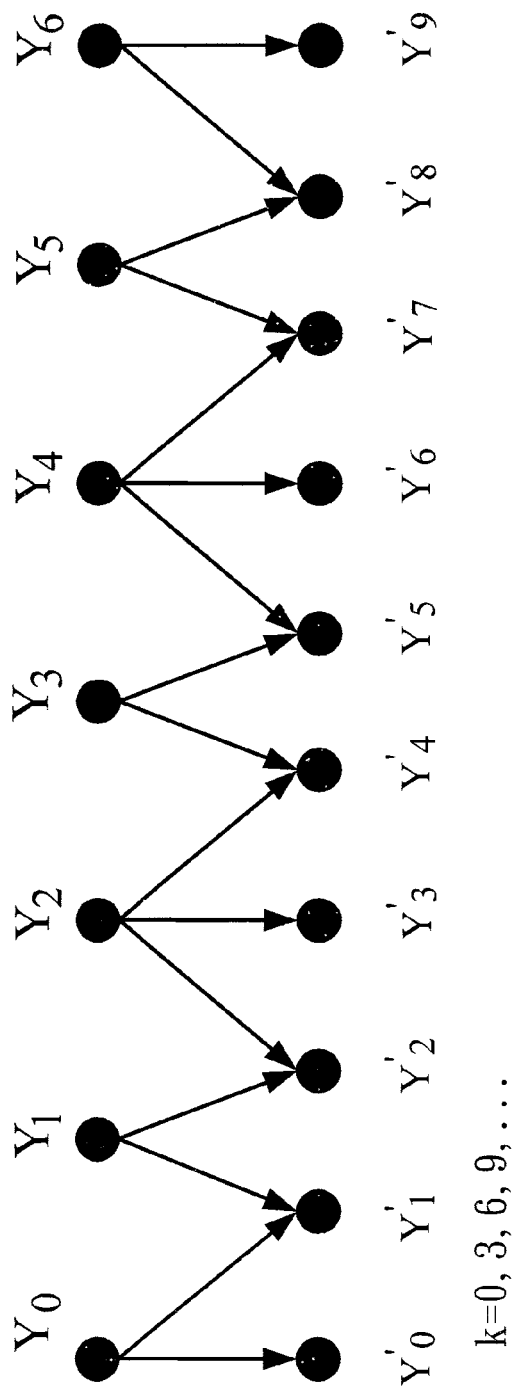
FIG. 10 is a schematic diagram of generating a luma by a second one-dimension scaler when a first YCrCb signal has a 640YCrCb444 format according to an embodiment of the invention.

When the first YCrCb signal is in the 640YCrCb444 or 640YCrCb422 format, the second one-dimension scaler 740 is enabled. FIG. 10 is a schematic diagram of generating a luma Y by the second one-dimension scaler 740 when the first YCrCb signal is in the 640YCrCb444 format. In this case, the second one-dimension scaler 740 can be expressed as follows:

$$Y'_j = Y_{j/3*2},$$

$$Y'_{j+1} = 5/16 * Y_{(j/3*2)} + 11/16 * Y_{(j/3*2+1)},$$

and $$Y'_{j+2} = 11/16 * Y_{(j/3*2+1)} + 5/16 * Y_{(j/3*2+2)},$$

where j is three times an integer, preferably j=0, 3, 6, 9, . . . ; $Y_{j/3*2}$, $Y_{(j/3*2+1)}$, $Y_{(j/3*2+2)}$ are lumas of the first YCrCb signal; $Y'_j$, $Y'_{j+1}$, $Y'_{j+2}$ are lumas of the second YCrCb signal YCrCb960 with the third horizontal resolution (960).

Figure 11:
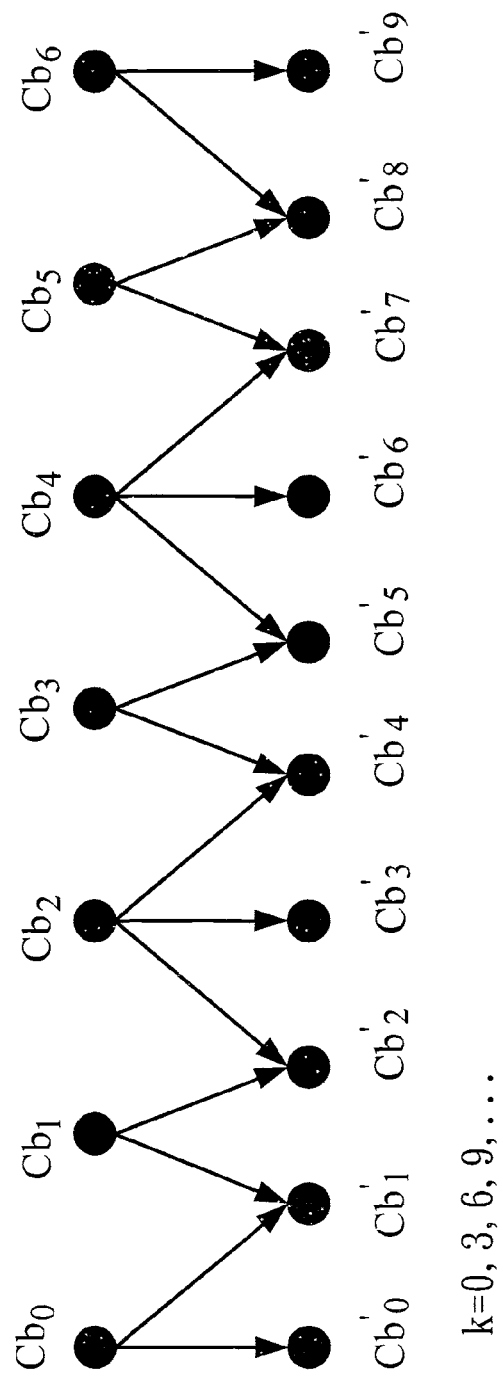
FIG. 11 is a schematic diagram of generating chromas Cr, Cb by a second one-dimension scaler when a first YCrCb signal has a 640YCrCb444 format according to an embodiment of the invention.

FIG. 11 is a schematic diagram of generating chromas Cr, Cb by the second one-dimension scaler 740 when the first YCrCb signal is in the 640YCrCb444 format. For example, for a chroma Cb, the second one-dimension scaler 740 can be expressed as follows:

$$Cb'_j = Cb_{j/3*2},$$

$$Cb'_{j+1} = 5/16 * Cb_{(j/3*2)} + 11/16 * Cb_{(j/3*2+1)},$$

and $$Cb'_{j+2} = 11/16 * Cb_{(j/3*2+1)} + 5/16 * Cb_{(j/3*2+2)},$$

where j is three times an integer, preferably j=0, 3, 6, 9, . . . , $Cb_{j/3*2}$; $Cb_{(j/3*2+1)}$, $Cb_{(j/3*2+2)}$ are chromas of the first YCrCb signal, and $Cb'_j$; $Cb'_{j+1}$, $Cb'_{j+2}$ are chromas of the second YCrCb signal with the third horizontal resolution (960). For a chroma Cr, the second one-dimension scaler 740 can be expressed as follows:

$$Cr'_j = Cr_{j/3*2},$$

$$Cr'_{j+1} = 5/16 * Cr_{(j/3*2)} + 11/16 * Cr_{(j/3*2+1)},$$

and $$Cr'_{j+2} = 11/16 * Cr_{(j/3*2+1)} + 5/16 * Cr_{(j/3*2+2)},$$

where j is three times an integer, $Cr_{j/3*2}$, $Cr_{(j/3*2+1)}$, $Cr_{(j/3*2+2)}$ are chromas of the first YCrCb signal, and $Cr'_j$, $Cr'_{j+1}$, $Cr'_{j+2}$ are chromas of the second YCrCb signal with the third horizontal resolution.

When the first YCrCb signal is in the 640YCrCb422 format, the lumas and the chromas can be obtained from the equations used in FIGS. 10 and 11, except that the first YCrCb signal has chromas expressed as $Cb_0 = Cb_1$, $Cb_2 = Cb_3$, . . . , $Cb_{638} = Cb_{639}$. Namely, the chromas of the first YCrCb signal have a general relation: $Cb_{2*w} = Cb_{2*w+1}$, and $Cr_{2*w} = Cr_{2*w+1}$, where w is an integer and w≥0. Those who skilled in the art can obtain the parameters from the equations used in FIGS. 8 and 9, and thus a detailed description is deemed unnecessary.

The second color domain converter 750 is connected to the first one-dimension scaler 730 and the second one-dimension scaler 740 in order to convert the second YCrCb signal YCrCb960 with the third horizontal resolution into an RGB signal 960RGB with the third horizontal resolution.

The RGB signal 960RGB with the third horizontal resolution is in a strip panel arrangement with a resolution of 960RGB×480. That is, one frame of the RGB signal 960RGB with the third horizontal resolution has 480 horizontal lines, and there are 960 pixels in each horizontal line and three subpixels in each pixel. The three subpixels include a red subpixel R, a green subpixel G, and a blue subpixel B.

The low pass filtering mapper 760 is connected to the second color domain converter 750 in order to filter and map the RGB signal 960RGB with the third horizontal resolution into an RGB signal 320RGB with a fourth horizontal resolution. The third horizontal resolution is a triple of the fourth horizontal resolution.

The RGB signal 320RGB with the fourth horizontal resolution is in a delta panel arrangement with a resolution of 320RGB×480. That is, one frame of the RGB signal 320RGB with the fourth horizontal resolution has 480 horizontal lines, and there are 960 pixels in each horizontal line, wherein each odd-numbered horizontal line is arranged in a sequence of red (R), green (G), blue (B) pixels repeatedly, and each even-numbered horizontal line is arranged in a sequence of green (G), blue (B), red (R) pixels repeatedly. The position of each pixel in an even-numbered horizontal line has a half-pixel dislocation to the position of each pixel in an odd-numbered horizontal line.

Figure 12:
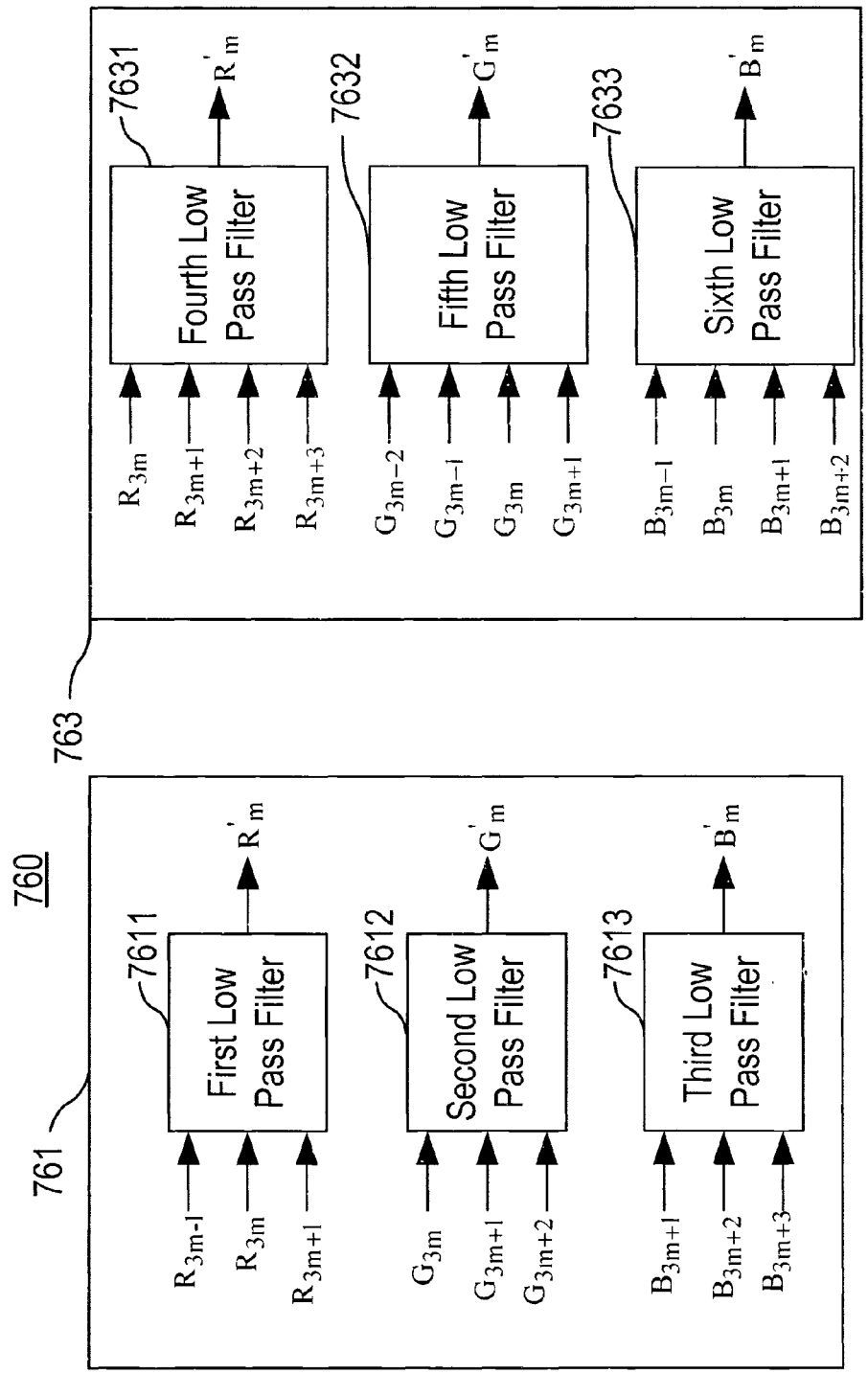
FIG. 12 is a block diagram of a low pass filtering mapper according to an embodiment of the invention.

FIG. 12 is a block diagram of the low pass filtering (LPF) mapper 760 according to an embodiment of the invention. The low pass filtering mapper 760 includes an odd horizontal line LPF mapper 761 and an even horizontal line LPF mapper 763.

The odd horizontal line LPF mapper 761 receives the odd-numbered horizontal lines of the RGB signal 960RGB with the third horizontal resolution and performs a low pass filtering and mapping on the odd-numbered horizontal lines to thereby generate the odd-numbered horizontal lines of an RGB signal 320RGB with a fourth horizontal resolution.

The even horizontal line LPF mapper 763 receives the even-numbered horizontal lines of the RGB signal 960RGB with the third horizontal resolution and performs a low pass filtering and mapping on the even-numbered horizontal lines to thereby generate the even-numbered horizontal lines of the RGB signal 320RGB with the fourth horizontal resolution.

The odd horizontal line LPF mapper 761 includes a first low pass filter 7611, a second low pass filter 7612, and a third low pass filter 7613 in order to perform a low pass filtering based on three pixels of each odd-numbered horizontal line of the RGB signal 960RGB with the third horizontal resolution to thereby generate three pixels of the odd-numbered horizontal line of the RGB signal 320RGB with the fourth horizontal resolution.

The first low pass filter 7611 can be expressed by the following equation:

$$R'_m = c_0 \times R_{(m*3-1)} + c_1 \times R_{m*3} + c_2 \times R_{(m*3+1)},$$

where m is an integer; $R'_m$ indicates a red pixel of the odd-numbered horizontal line of the RGB signal 320RGB with the fourth horizontal resolution (320); $R_{(m*3-1)}$, $R_{m*3}$, $R_{(m*3+1)}$ indicate respective red subpixels of the three pixels of the odd-numbered horizontal line of the RGB signal 960RGB with the third horizontal resolution (960); $c_0$, $c_1$, $c_2$ indicate coefficients of the first low pass filter 7611 corresponding to the red subpixels, respectively.

The second low pass filter 7612 can be expressed by the following equation:

$$G'_m = c_3 \times G_{(m*3)} + c_4 \times G_{(m*3+1)} + c_5 \times G_{(m*3+2)},$$

where m is an integer; $G'_m$ indicates a green pixel of the odd-numbered horizontal line of the RGB signal 320RGB with the fourth horizontal resolution (320); $G_{(m*3)}$, $G_{(m*3+1)}$, $G_{(m*3+2)}$ indicate respective green subpixels of the three pixels of the odd horizontal line of the RGB signal 960RGB with the third horizontal resolution (960); $c_3$, $c_4$, $c_5$ indicate coefficients of the second low pass filter 7612 corresponding to the green subpixels, respectively.

The third low pass filter 7613 can be expressed by the following equation:

$$B'_m = c_6 \times B_{(m*3-1)} + c_7 \times B_{(m*3+2)} + c_8 \times B_{(m*3+3)},$$

where m is an integer; $B'_m$ indicates a blue pixel of the odd-numbered horizontal line of the RGB signal 320RGB with the fourth horizontal resolution (320); $B_{m*3+1}$, $B_{(m*3+2)}$, $B_{(m*3+3)}$ indicate respective blue subpixels of the three pixels of the odd-numbered horizontal line of the RGB signal 960RGB with the third horizontal resolution (960); $c_6, c_7, c_8$ indicate coefficients of the third low pass filter 7613 corresponding to the blue subpixels, respectively.

The even horizontal line LPF mapper 763 includes a fourth low pass filter 7631, a fifth low pass filter 7632, and a sixth low pass filter 7633 in order to perform a low pass filtering based on four pixels of each even-numbered horizontal line of the RGB signal 960RGB with the third horizontal resolution to thereby generate three pixels of the even-numbered horizontal line of the RGB signal 320RGB with the fourth horizontal resolution.

The fourth low pass filter 7631 can be expressed by the following equation:

$$R'_m = c_9 \times R_{(m*3)} + c_{10} \times R_{(m*3+1)} + c_{11} \times R_{(m*3+2)} + c_{12} \times R_{(m*3+3)},$$

where m is an integer; $R'_m$ indicates a red pixel of the even-numbered horizontal line of the RGB signal 320RGB with the fourth horizontal resolution (320); $R_{m*3}$, $R_{(m*3+1)}$, $R_{(m*3+2)}$, $R_{(m*3+3)}$ indicate respective red subpixels of the four pixels of the even-numbered horizontal line of the RGB signal 960RGB with the third horizontal resolution (960); $C_9, c_{10}, c_{11}, c_{12}$ indicate coefficients of the fourth low pass filter 7631 corresponding to the red subpixels, respectively.

The fifth low pass filter 7632 can be expressed by the following equation:

$$G'_m = c_{13} \times G_{(m*3-2)} + c_{14} \times G_{(m*3-1)} + c_{15} \times G_{(m*3)} + c_{16} \times G_{(m*3+1)},$$

where m is an integer; $G'_m$ indicates a green pixel of the even-numbered horizontal line of the RGB signal 320RGB with the fourth horizontal resolution (320); $G_{(m*3-2)}$, $G_{(m*3-1)}$, $G_{(m*3)}$, $G_{(m*3+1)}$ indicate respective green subpixels of the four pixels of the even-numbered horizontal line of the RGB signal 960RGB with the third horizontal resolution (960); $c_{13}, c_{14}, c_{15}, c_{16}$ indicate coefficients of the fifth low pass filter 7632 corresponding to the green subpixels, respectively.

The sixth low pass filter 7633 can be expressed by the equation:

$$B'_m = c_{17} \times B_{(m*3-1)} + c_{18} \times B_{(m*3)} + c_{19} \times B_{(m*3+1)} + c_{20} \times B_{(m*3+2)},$$

where m is an integer; $B'_m$ indicates a blue pixel of the even-numbered horizontal line of the RGB signal 320RGB with the fourth horizontal resolution (320); $B_{(m*3-1)}$, $B_{(m*3)}$, $B_{(m*3+1)}$, $B_{(m*3+2)}$ indicate respective blue subpixels of the four pixels of the even-numbered horizontal line of the RGB signal 960RGB with the third horizontal resolution (960); $c_{17}, c_{18}, c_{19}, c_{20}$ indicate coefficients of the sixth low pass filter 7633 corresponding to the blue subpixels, respectively.

Figure 13:
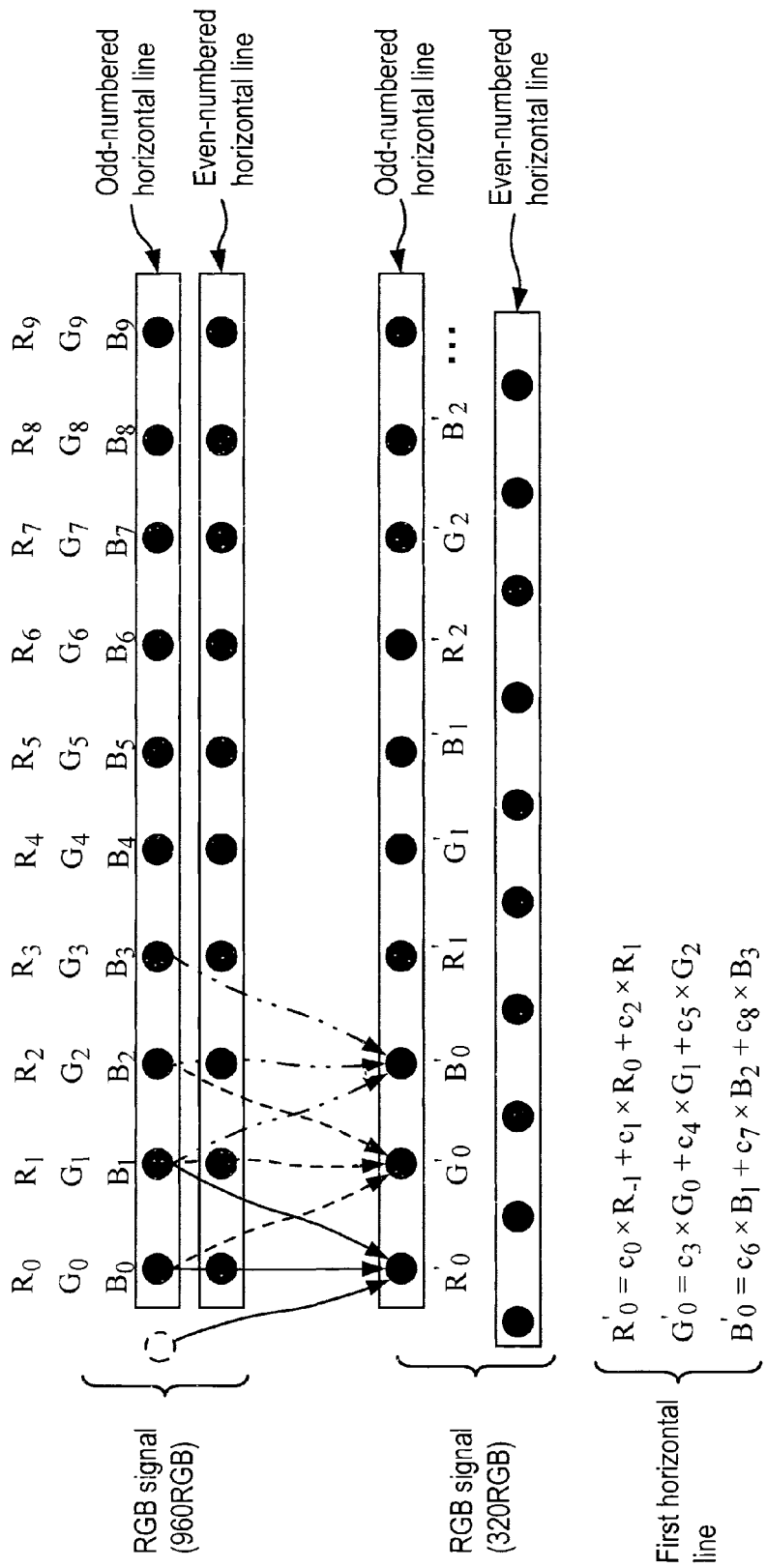
FIG. 13 is a schematic diagram of an operation of an odd horizontal line low pass filtering mapper according to an embodiment of the invention.

FIG. 13 is a schematic diagram of an operation of the odd horizontal line low pass filtering mapper 761 according to an embodiment of the invention. As shown in FIG. 13, the odd horizontal line low pass filtering mapper 761 generates the pixel $R_0$ of the first horizontal line of the RGB signal 320RGB with the fourth horizontal resolution (320) based on three pixels $(R_1, R_0, R_1)$ of, for example, the first horizontal line of the RGB signal 960RGB with the third horizontal resolution (960), the pixel $G_0$ based on three pixels $(G_0, G_1, G_2)$, and the pixel $B_0$ based on three pixels $(B_1, B_2, B_3)$. The other odd-numbered horizontal lines can be operated as same as the first horizontal line, and when the pixel $R_{-1}$ cannot be found, the pixel $R_0$ that is closest to the pixel $R_{-1}$ is used in the operation.

Figure 14:
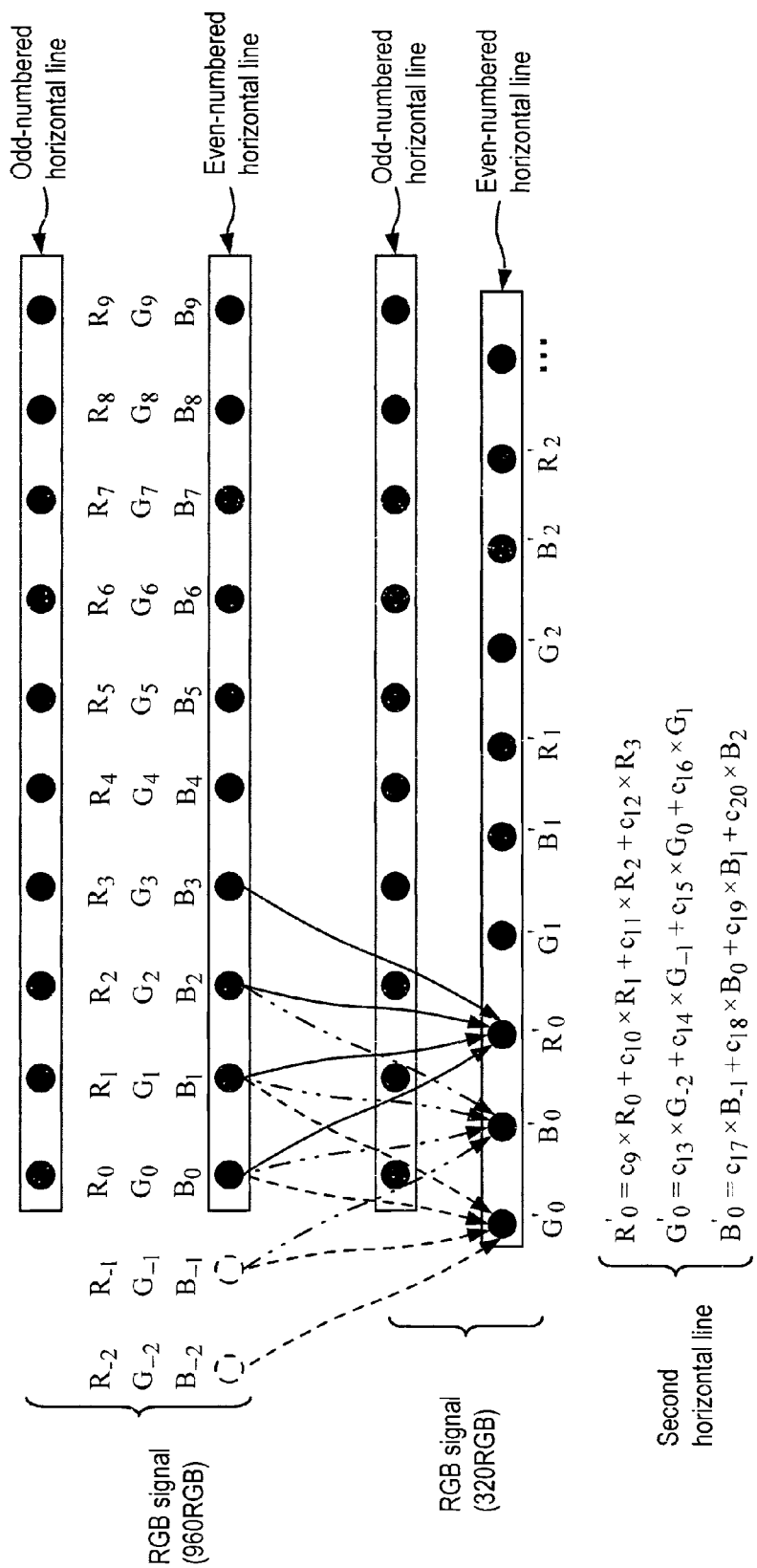
FIG. 14 is a schematic diagram of an operation of an even horizontal line low pass filtering mapper according to an embodiment of the invention.

FIG. 14 is a schematic diagram of an operation of the even horizontal line low pass filtering mapper 763 according to an embodiment of the invention. As shown in FIG. 14, the even horizontal line low pass filtering mapper 763 generates the pixel $R_0$ of the second horizontal line of the RGB signal 320RGB with the fourth horizontal resolution (320) based on four pixels $(R_0, R_1, R_2, R_3)$ of, for example, the second horizontal line of the RGB signal 960RGB with the third horizontal resolution (960), the pixel $G_0$ based on four pixels $(G_{-2}, G_{-1}, G_0, G_1)$, and the pixel $B_0$ based on four pixels $(B_{-1}, B_0, B_1, B_2)$. The other even-numbered horizontal lines can be operated as same as the second horizontal line, and when the pixel $G_{-1}$ cannot be found, the pixel $G_0$ that is closest to the pixel $G_{-1}$ is used in the operation. Likewise, when the pixel $G_{-2}$ and the pixel $B_{-1}$ cannot be found, the pixel $G_{-2}$ can be replaced with $G_{-1}$, and the pixel $B_{-1}$ can be replaced with $B_0$.

Figure 1:
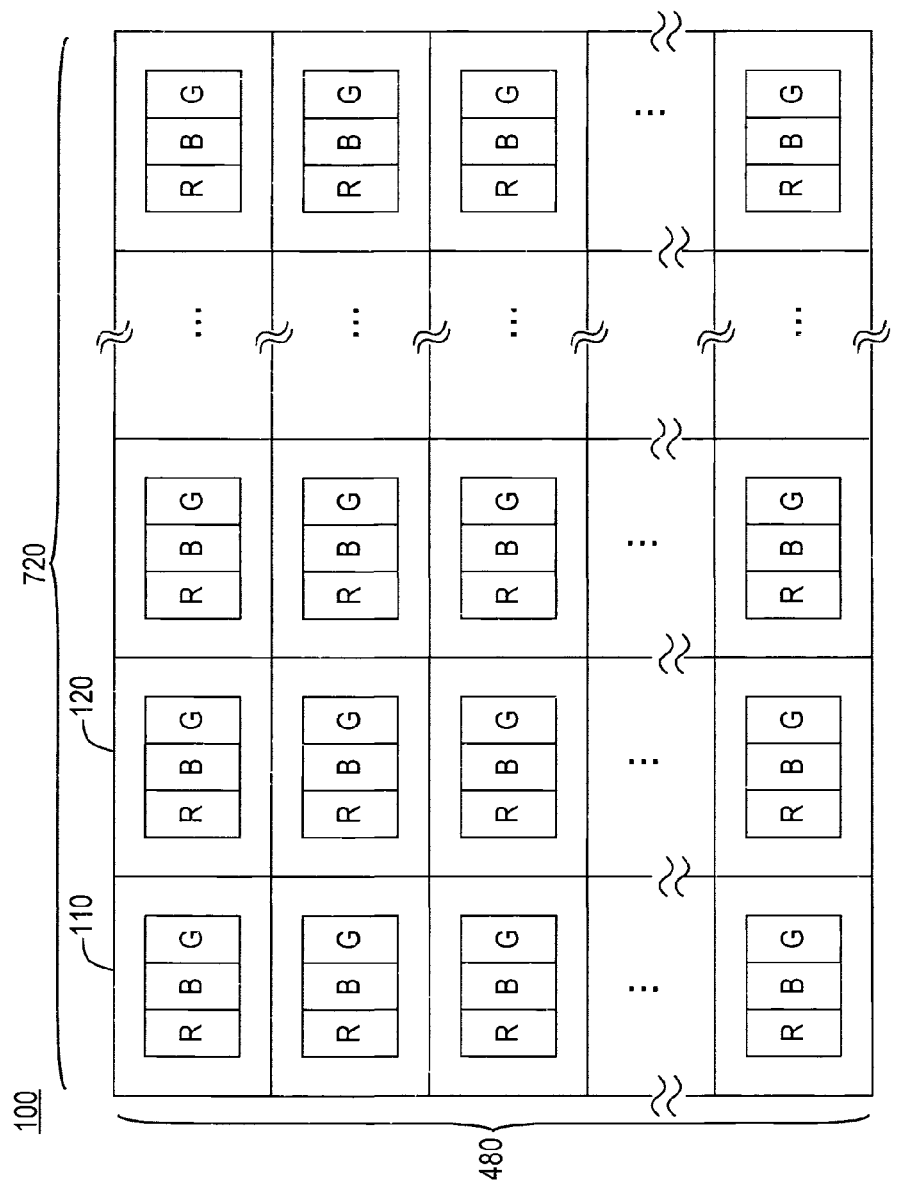
FIG. 1 is a schematic diagram of a typical strip panel.
Figure 2:
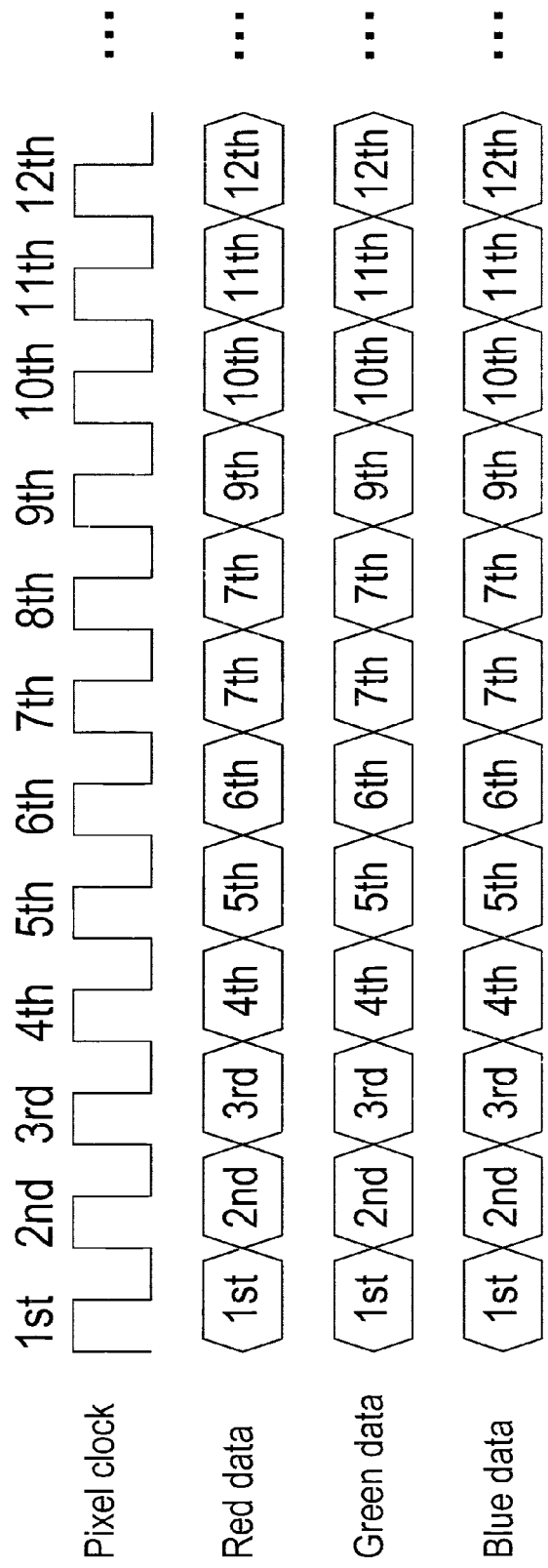
FIG. 2 is a timing diagram of color data and a pixel clock for a typical strip panel.
Figure 3:
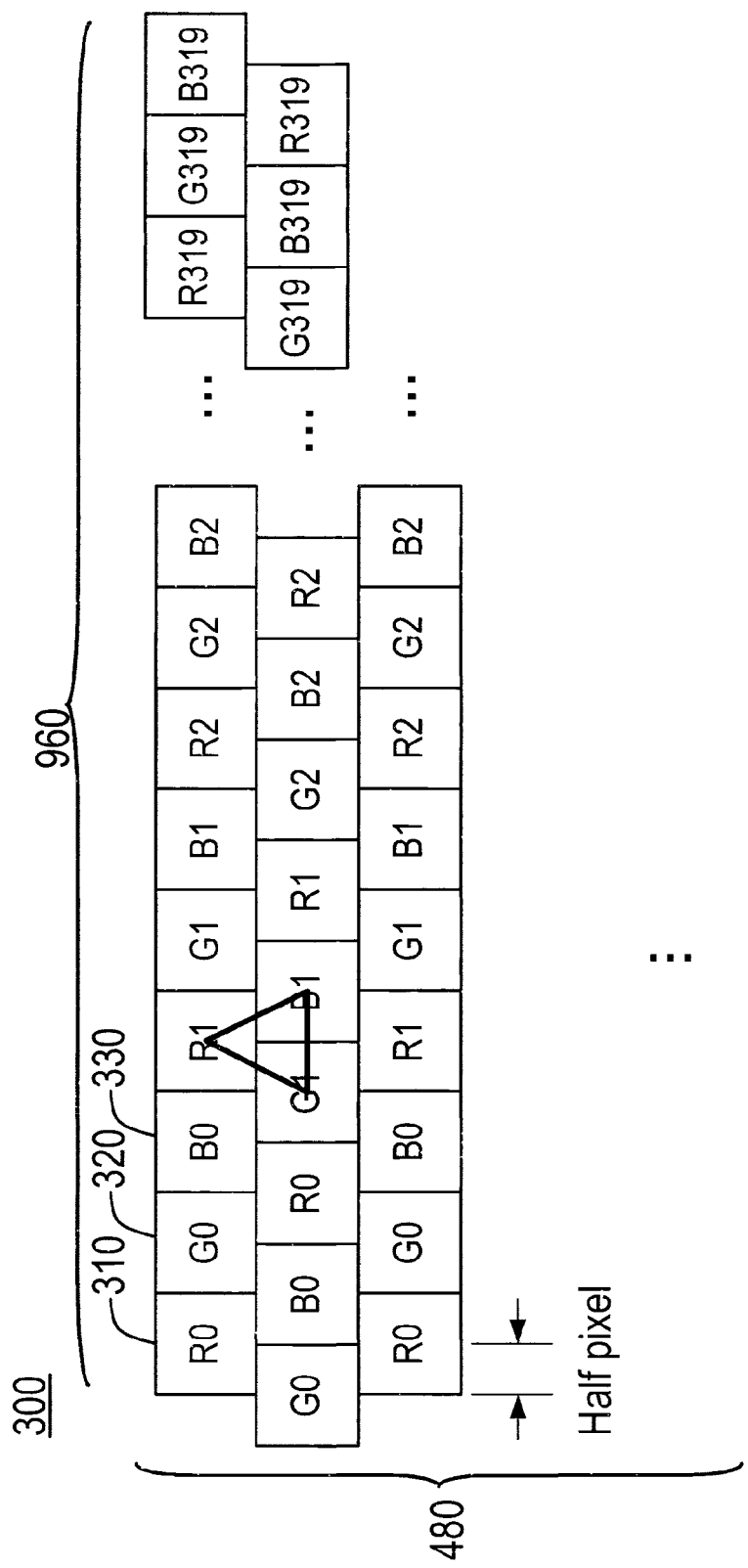
FIG. 3 is a schematic diagram of a typical delta panel.
Figure 4:
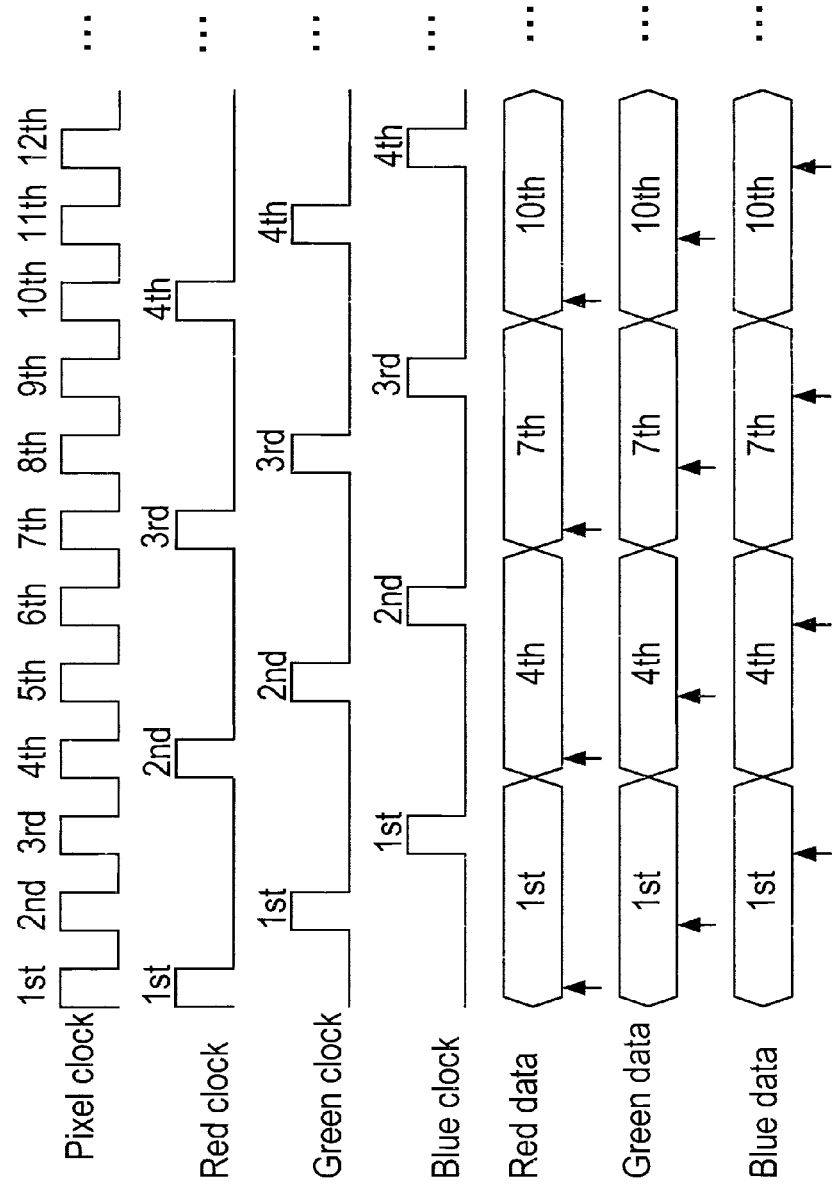
FIG. 4 is a timing diagram of color data of data lines and associated pixel clocks that are converted by a typical control circuit.
Figure 5:
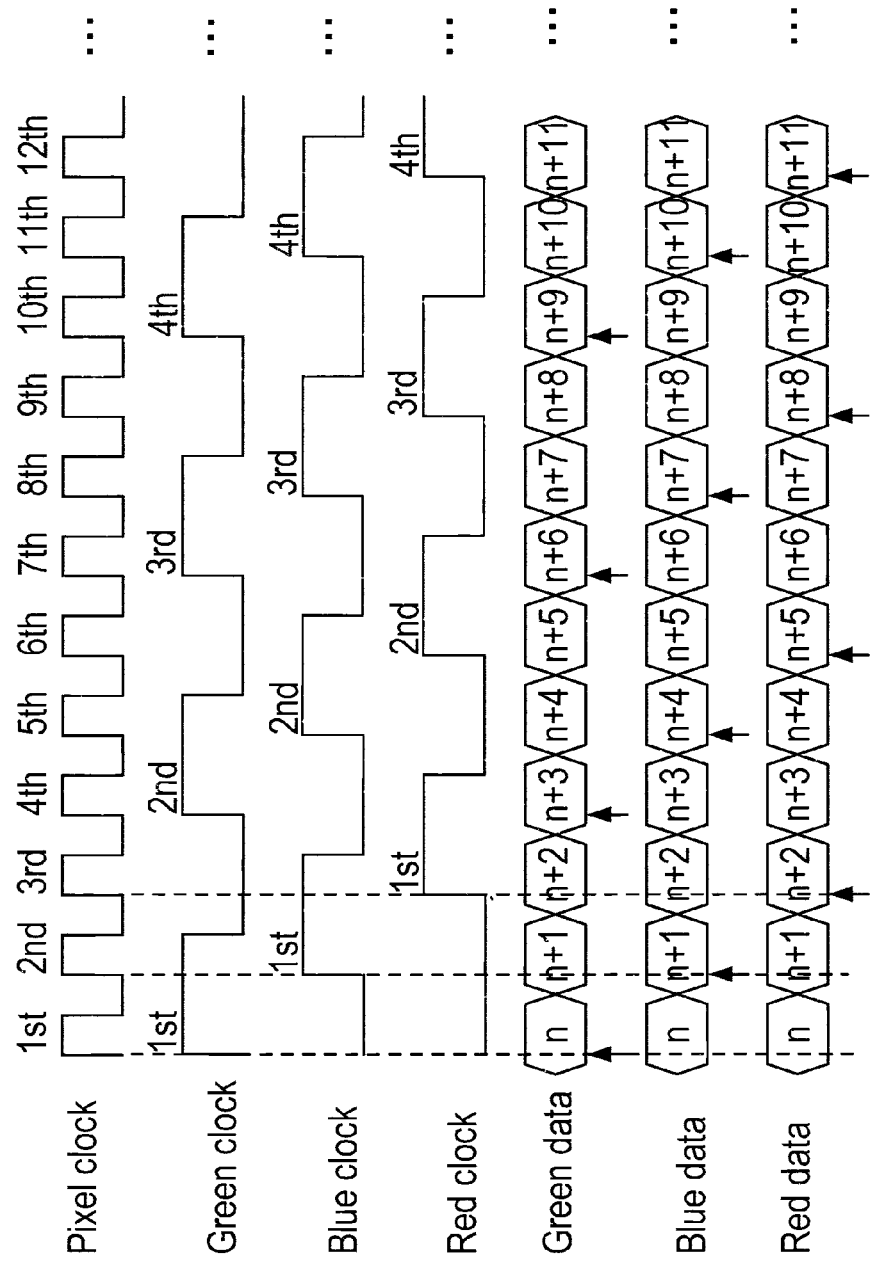
FIG. 5 is a timing diagram of color data and associated pixel clocks for horizontal lines of a typical delta panel.
Figure 6:
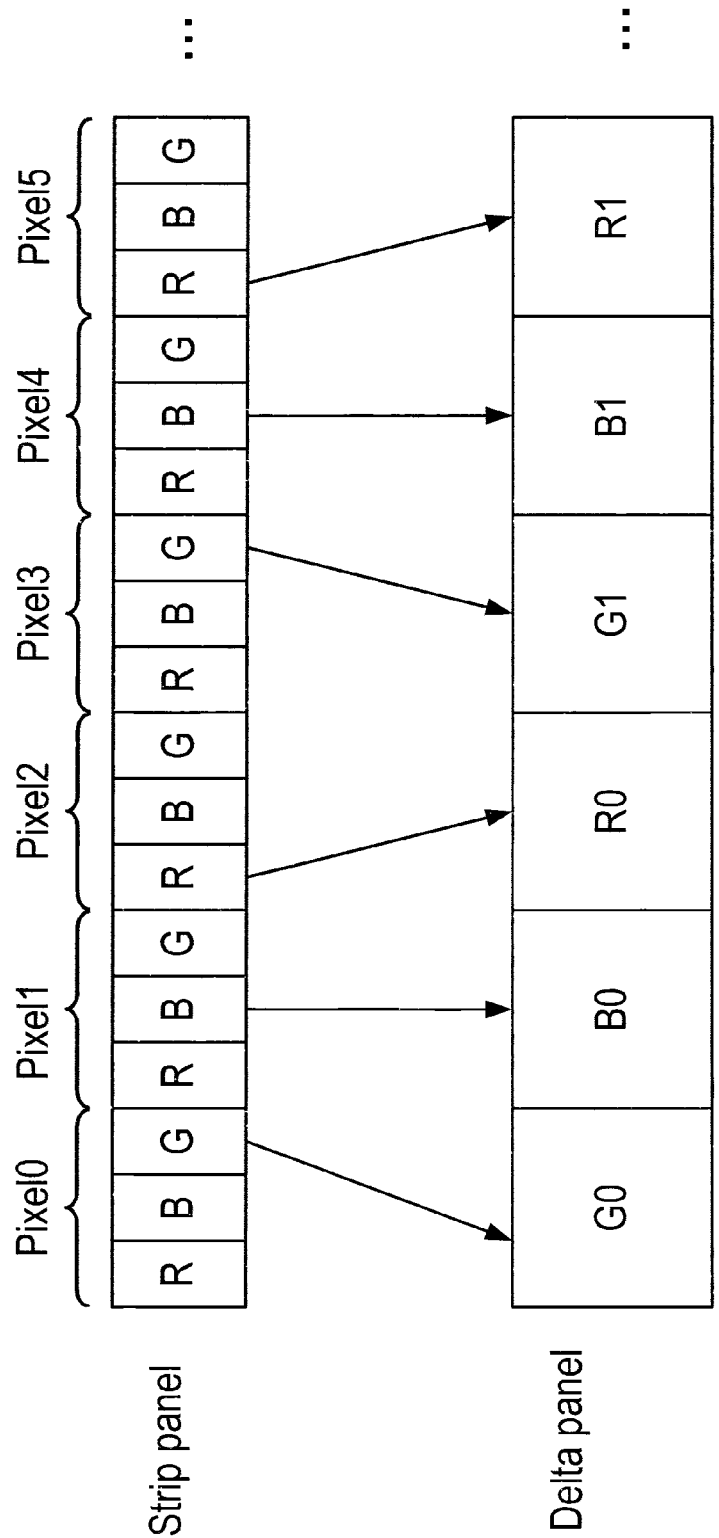
FIG. 6 schematically illustrating a relationship between three color subpixels of a typical strip panel and pixels of a typical delta panel.

By comparing FIG. 6 of the prior art with FIGS. 13 and 14 of the present invention, it is known that in the invention the LPF mapper 760 is designed to perform a low pass filtering and mapping in view of the space pixel model of delta panels and the half pixel dislocation between odd-numbered and even-numbered horizontal lines, so that the prior problems of zigzag edges, line deformation, and color fringing can be avoided when an image is displayed on a delta panel, thereby effectively improving the displayed frame quality.

Figure 15:
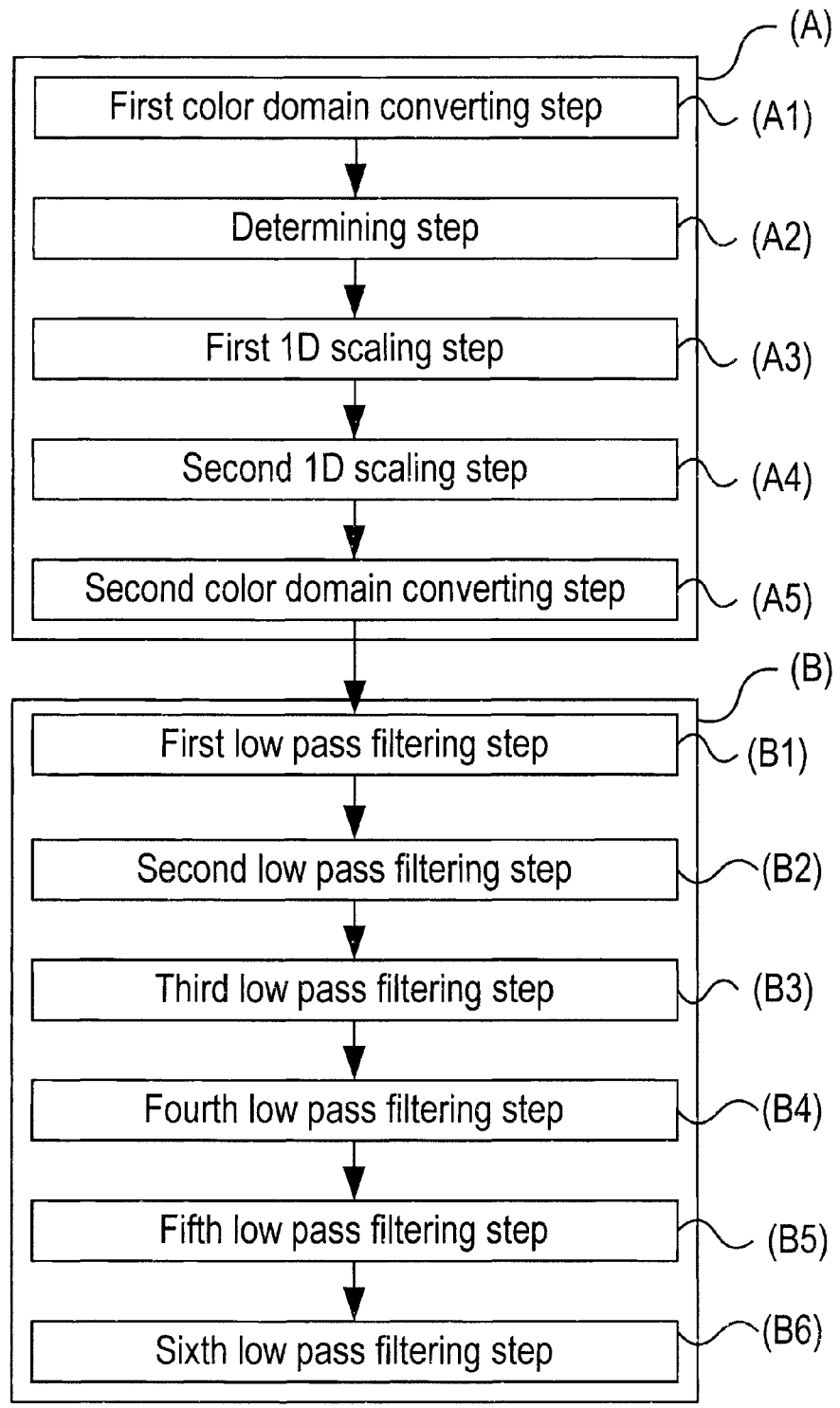
FIG. 15 is a flowchart of a pixel data conversion method for display with delta panel arrangement.

FIG. 15 is a flowchart of a pixel data conversion method for display with delta panel arrangement. As shown in FIG. 15, step (A) converts an input video signal from an RGB domain into an RGB signal 960RGB with a third horizontal resolution (960). The RGB signal with the third horizontal resolution is in a strip panel arrangement having a resolution of 960RGB×480 and has 480 horizontal lines in one frame, with 960 pixels in each horizontal line and three subpixels in each pixel, including red, green, and blue subpixels.

Step (B) filters and maps the RGB signal with the third horizontal resolution (960) into an RGB signal with a fourth horizontal resolution (320). The RGB signal with the fourth horizontal resolution (320) is in a delta panel arrangement with a resolution of 320RGB×480 and has 480 horizontal lines in one frame. There are 960 pixels in every horizontal line, repeatedly arranged in a sequence of red (R), green (G), blue (B) pixels for each odd-numbered horizontal line and in a sequence of green (G), blue (B), red (R) pixels for each even-numbered horizontal line. The position of each pixel in an even-numbered horizontal line has a half-pixel dislocation to the position of each pixel in an odd-numbered horizontal line.

Furthermore, step (A) can be divided into steps (A1)-(A5). Step (A1) performs a first color domain converting step in order to convert an input video signal from an RGB domain into a YCrCb domain to thereby generate a first YCrCb signal. For clarity of description, the input video signal is given with 720RGB×480 and 640RGB×480 formats, and those who skilled in the art can readily find other formats of the input video signal based on the description.

When the input video signal is in the 720RGB×480 format, the first color domain converting step outputs the first YCrCb signal with a format of 720YCrCb444 or 720YCrCb422. When the input video signal is in the 640RGB×480 format, the first color domain converting step outputs the first YCrCb signal with a format of 640YCrCb444 or 640YCrCb422.

Step (A2) performs a determining step in order to determine a horizontal resolution of the first YCrCb signal. When the first YCrCb signal is a first horizontal resolution (720), a first enable signal 1st_en is generated. When the first YCrCb signal is a second horizontal resolution (640), a second enable signal 2nd_en is generated.

Step (A3) performs a first one-dimension scaling step in order to scale the first YCrCb signal to become a second YCrCb signal YCrCb960 with a third horizontal resolution (960) when the first enable signal 1st_en is activated (true).

When the first YCrCb signal is in the 720YCrCb444 or 720YCrCb422 format, the first one-dimension scaling step is enabled, as shown in FIG. 8, with a luma expressed by the equations as follows:

$$Y'_k = Y_{k/4*3},$$

$$Y'_{k+1} = 1/4 * Y_{(k/4*3)} + 3/4 * Y_{(k/4*3+1)},$$

$$Y'_{k+2} = 1/2 * Y_{(k/4*3+1)} + 1/2 * Y_{(k/4*3+2)},$$

and $$Y'_{k+3} = 3/4 * Y_{(k/4*3+2)} + 1/4 * Y_{(k/4*3+3)},$$

where k is four times an integer, preferably k=0, 4, 8, 12, . . . ; $Y_{k/4*3}, Y_{(k/4*3+1)}, Y_{(k/4*3+2)}, Y_{(k/4*3+3)}$ are lumas of the first YCrCb signal; $Y'_k, Y'_{k+1}, Y'_{k+2}, Y'_{k+2}, Y'_{k+3}$ are lumas of the second YCrCb signal YCrCb960 with the third horizontal resolution (960).

When the first YCrCb signal in the first one-dimension scaling step is in the 720YCrCb444 format, the chromas Cr, Cb can be generated with reference to FIG. 9. FIG. 9 is a schematic diagram of generating the chromas Cr, Cb in the first one-dimension scaling step when the first YCrCb signal is in the 720YCrCb444 format. For example, for a chroma Cb, the first one-dimension scaler 730 can be expressed as follows:

$$Cb'_k = Cb_{k/4*3},$$

$$Cb'_{k+1} = 1/4 * Cb_{(k/4*3)} + 3/4 * Cb_{(k/4*3+1)},$$

$$Cb'_{k+2} = 1/2 * Cb_{(k/4*3+1)} + 1/2 * Cb_{(k/4*3+2)},$$

and $$Cb'_{k+3} = 3/4 * Cb_{(k/4*3+2)} + 1/4 * Cb_{(k/4*3+3)},$$

where k is four times an integer, preferably k=0, 4, 8, 12, . . . ; $Cb_{k/4*3}, Cb_{(k/4*3+1)}, Cb_{(k/4*3+2)}, Cb_{(k/4*3+3)}$ are chromas of the first YCrCb signal; $Cb'_k, Cb'_{k+1}, Cb'_{k+2}, Cb'_{k+3}$ are chromas of the second YCrCb signal YCrCb960 with the third horizontal resolution (960).

When the first YCrCb signal is in the 720YCrCb422 format, the lumas and the chromas can be obtained from the equations used in FIGS. 8 and 9, except that the first YCrCb signal has the chromas $Cb_0 = Cb_1$, $Cb_2 = Cb_3$, . . . , $Cb_{718} = Cb_{719}$, and so on. Likewise, the chroma Cr can be obtained from the equations used in FIGS. 8 and 9 by those who skilled in the art, and thus a detailed description is deemed unnecessary.

Step (A4) performs a second one-dimension scaling step in order to scale the first YCrCb signal to become the second YCrCb signal YCrCb960 with the third horizontal resolution (960) when the second enable signal 2nd_en is activated.

When the first YCrCb signal is in the 640YCrCb444 or 640YCrCb422 format, the second one-dimension scaling step is enabled. FIG. 10 is a schematic diagram of generating a luma Y in the second one-dimension scaling step when the first YCrCb signal is in the 640YCrCb444 format. In this case, the second one-dimension scaling step can be expressed by the equations as follows.

$$Y'_j = Y_{j/3*2},$$

$$Y'_{j+1} = 5/16 * Y_{(j/3*2)} + 11/16 * Y_{(j/3*2+1)},$$

and $$Y'_{j+2} = 11/16 * Y_{(j/3*2+1)} + 5/16 * Y_{(j/3*2+2)},$$

where j is three times an integer, preferably j=0, 3, 6, 9, . . . ; $Y_{j/3*2}, Y_{(j/3*2+1)}, Y_{(j/3*2+2)}$ are lumas of the first YCrCb signal; $Y'_j, Y'_{j+1}, Y'_{j+2}$ are lumas of the second YCrCb signal YCrCb960 with the third horizontal resolution (960).

When the first YCrCb signal is in the 640YCrCb444 format, the second one-dimension scaling step generates the chromas Cr, Cb with reference to FIG. 11. FIG. 11 is a schematic diagram of generating the chromas Cr, Cb in the second one-dimension scaling step when the first YCrCb signal is in the 640YCrCb444 format. For example, for a chroma Cb, the second one-dimension scaling step can be expressed by the equations as follows:

$$Cb'_j = Cb_{j/3*2},$$

$$Cb'_{j+1} = 5/16 * Cb_{(j/3*2)} + 11/16 * Cb_{(j/3*2+1)},$$

and $$Cb'_{j+2} = 11/16 * Cb_{(j/3*2+1)} + 5/16 * Cb_{(j/3*2+2)},$$

where j is three times an integer, preferably j=0, 3, 6, 9, . . . ; $Cb_{j/3*2}, Cb_{(j/3*2+1)}, Cb_{(j/3*2+2)}$ are chromas of the first YCrCb signal; $Cb'_j, Cb'_{j+1}, Cb'_{j+2}$ are chromas of the second YCrCb signal with the third horizontal resolution (960).

When the first YCrCb signal is in the 640YCrCb422 format, the lumas and the chromas can be obtained from the equations used in FIGS. 10 and 11, except that the first YCrCb signal has the chromas $Cb_0 = Cb_1$, $Cb_2 = Cb_3$, . . . , $Cb_{638} = Cb_{639}$, and so on. Likewise, the chroma Cr can be obtained from the equations used in FIGS. 10 and 11 by those who skilled in the art, and thus a detailed description is deemed unnecessary.

Step (A5) performs a second color domain converting step in order to convert the second YCrCb signal YCrCb960 with the third horizontal resolution into the RGB signal 960RGB with the third horizontal resolution.

Step (B) can be divided into steps (B1)-(B6). Step (B1) performs a first low pass filtering step, which can be expressed by the equation as follows:

$$R'_m = c_0 \times R_{(m*3-1)} + c_1 \times R_{m*3} + c_2 \times R_{(m*3+1)},$$

where m is an integer; $R'_m$ indicates a red pixel of the odd-numbered horizontal line of the RGB signal 320RGB with the fourth horizontal resolution (320); $R_{(m*3-1)}, R_{m*3}, R_{(m*3+1)}$ indicate respective red subpixels of the three pixels of the odd-numbered horizontal line of the RGB signal 960RGB with the third horizontal resolution (960); $c_0, c_1, c_2$ indicate coefficients respectively corresponding to the red subpixels in the first low pass filtering step.

Step (B2) performs a second low pass filtering step, which can be expressed by the equation as follows:

$$G'_m = c_3 \times G_{(m*3)} + c_4 \times G_{(m*3+1)} + c_5 \times G_{(m*3+2)},$$

where m is an integer; $G'_m$ indicates a green pixel of the odd-numbered horizontal line of the RGB signal 320RGB with the fourth horizontal resolution (320); $G_{(m*3)}, G_{(m*3+1)}, G_{(m*3+2)}$ indicate respective green subpixels of the three pixels of the odd-numbered horizontal line of the RGB signal 960RGB with the third horizontal resolution (960); $c_3, c_4, c_5$ indicate coefficients respectively corresponding to the green subpixels in the second low pass filtering step.

Step (B3) performs a third low pass filtering step, which is expressed by the equation as follows:

$$B'_m = c_6 \times B_{(m*3-1)} + c_7 \times B_{(m*3+2)} + c_8 \times B_{(m*3+3)},$$

where m is an integer; $B'_m$ indicates a blue pixel of the odd-numbered horizontal line of the RGB signal 320RGB with the fourth horizontal resolution (320); $B_{(m*3+1)}$, $B_{(m*3+2)}$, $B_{(m*3+3)}$ indicate respective blue subpixels of the three pixels of the odd-numbered horizontal line of the RGB signal 960RGB with the third horizontal resolution (960); $c_6, c_7, c_8$ indicate coefficients respectively corresponding to the blue subpixels in the third low pass filtering step.

Step (B4) performs a fourth low pass filtering step, which is expressed by the equation as follows:

$$R'_m = c_9 \times R_{(m*3)} + c_{10} \times R_{(m*3+1)} + c_{11} \times R_{(m*3+2)} c_{12} \times R_{(m*3+3)},$$

where m is an integer; $R'_m$ indicates a red pixel of the even-numbered horizontal line of the RGB signal 320RGB with the fourth horizontal resolution (320); $R_{m*3}$, $R_{(m*3+1)}$, $R_{(m*3+2)}$, $R_{(m*3+3)}$ indicate respective red subpixels of the four pixels of the even-numbered horizontal line of the RGB signal 960RGB with the third horizontal resolution (960); $c_9, c_{10}, c_{11}, c_{12}$ indicate coefficients respectively corresponding to the red subpixels in the fourth low pass filtering step.

Step (B5) performs a fifth low pass filtering step, which is expressed by the equation as follows:

$$G'_m = c_{13} \times G_{(m*3-2)} + c_{14} \times G_{(m*3+1)} + c_{15} \times G_{(m*3)} + c_{16} \times G_{(m*3+1)},$$

where m is an integer; $G'_m$ indicates a green pixel of the even-numbered horizontal line of the RGB signal 320RGB with the fourth horizontal resolution (320); $G_{(m*3-2)}$, $G_{(m*3-1)}$, $G_{(m*3)}$, $G_{(m*3+1)}$ indicate respective green subpixels of the four pixels of the even-numbered horizontal line of the RGB signal 960RGB with the third horizontal resolution (960); $c_{13}, c_{14}, c_{15}, c_{16}$ indicate coefficients respectively corresponding to the green subpixels in the fifth low pass filtering step.

Step (B6) performs a sixth low pass filtering step, which is expressed by the equation as follows:

$$B'_m = c_{17} \times B_{(m*3-1)} + c_{18} \times B_{(m*3)} + c_{19} \times B_{(m*3+1)} + c_{20} \times B_{(m*3+2)},$$

where m is an integer; $B'_m$ indicates a blue pixel of the even-numbered horizontal line of the RGB signal 320RGB with the fourth horizontal resolution (320); $B_{(m*3-1)}$, $B_{(m*3)}$, $B_{(m*3+1)}$, $B_{(m*3+2)}$ indicate respective blue subpixels of the four pixels of the even-numbered horizontal line of the RGB signal 960RGB with the third horizontal resolution (960); $c_{17}, c_{18}, c_{19}, c_{20}$ indicate coefficients respectively corresponding to the green subpixels in the sixth low pass filtering step.

As cited, the prior art does not consider the pixel structure of delta panels and the half pixel dislocation between odd and even horizontal lines, resulting in causing the problems of zigzag edges, line deformation, and color fringing when an image is displayed on a delta panel. However, in the invention, since the LPF mapper performs a low pass filtering and mapping in view of the space pixel model of delta panels and the half pixel dislocation between odd-numbered and even-numbered horizontal lines, the prior problems of zigzag edges, line deformation, and color fringing can be avoided when an image is displayed on a delta panel, thereby improving the displayed frame quality.

Although the present invention has been explained in relation to its preferred embodiment, it is to be understood that many other possible modifications and variations can be made without departing from the spirit and scope of the invention as hereinafter claimed.

What is claimed is:

1. A pixel data conversion apparatus for display with delta panel arrangement, comprising:
    a first color domain converter, for converting an input video signal from a Red, Green, and Blue (RGB) domain into a YCrCb domain to generate a first YCrCb signal;
    a determinator, connected to the first color domain converter, for determining a horizontal resolution of the first YCrCb signal, wherein a first enable signal is generated when the first YCrCb signal is a first horizontal resolution and a second enable signal is generated when the first YCrCb signal is a second horizontal resolution;
    a first one-dimension scaler, connected to the determinator for scaling the first YCrCb signal to generate a second YCrCb signal with a third horizontal resolution when the first enable signal is activated;
    a second one-dimension scaler, connected to the determinator for scaling the first YCrCb signal to generate the second YCrCb signal with the third horizontal resolution when the second enable signal is activated;
    a second color domain converter, connected to the first one-dimension scaler and the second one-dimension scaler, for converting the second YCrCb signal with the third horizontal resolution into an RGB signal with the third horizontal resolution; and
    a low pass filtering mapper, connected to the second color domain converter, for filtering and mapping the RGB signal with the third horizontal resolution into an RGB signal with a fourth horizontal resolution,
    wherein the third horizontal resolution is triple times as much as the fourth horizontal resolution.

2. The apparatus as claimed in claim 1, wherein the RGB signal with the third horizontal resolution is in a strip panel arrangement with a resolution of 960RGB×480 that has 480 horizontal lines in one frame, wherein there are 960 pixels in the horizontal lines respectively and three sub-pixels in each pixel, including red, green, and blue sub-pixels.

3. The apparatus as claimed in claim 2, wherein the RGB signal with the fourth horizontal resolution is in the delta panel arrangement with a resolution of 320RGB×480 that has 480 horizontal lines in one frame, and there are 960 pixels in the horizontal lines respectively, wherein each odd-numbered horizontal line arranged in a sequence of red, green, blue pixels and each even-numbered horizontal line arranged in a sequence of green, blue, red pixels repeatedly, and a position of each pixel in an even-numbered horizontal line has a half-pixel dislocation to a position of each pixel in an odd-numbered horizontal line.

4. The apparatus as claimed in claim 3, wherein the low pass filtering mapper includes an odd horizontal line low pass filtering mapper and an even horizontal line low pass filtering mapper, such that the odd horizontal line low pass filtering mapper receives the odd-numbered horizontal lines of the RGB signal with the third horizontal resolution and performs a low pass filtering and mapping on the odd-numbered horizontal lines to generate the odd-numbered horizontal lines of the RGB signal with the fourth horizontal resolution, and the even horizontal line low pass filtering mapper receives the even-numbered horizontal lines of the RGB signal with the third horizontal resolution and performs the low pass filtering and mapping on the even-numbered horizontal lines to generate the even-numbered horizontal lines of the RGB signal with the fourth horizontal resolution.

5. The apparatus as claimed in claim 4, wherein the odd horizontal line low pass filtering mapper includes a first low pass filter, a second low pass filter, and a third low pass filter for performing a low pass filtering based on three pixels of each odd-numbered horizontal line of the RGB signal with the third horizontal resolution to generate three pixels of the odd-numbered horizontal line of the RGB signal with the fourth horizontal resolution.

6. The apparatus as claimed in claim 5, wherein the first low pass filter is expressed as follows:

$$R'_m = c_0 \times R_{(m*3-1)} + c_1 \times R_{m*3} + c_2 \times R_{(m*3+1)},$$

where m is an integer, $R'_m$ indicates a red pixel of the odd-numbered horizontal line of the RGB signal with the fourth horizontal resolution, $R_{(m*3-1)}$, $R_{m*3}$, $R_{(m*3+1)}$ indicate respective red subpixels of the three pixels of the odd-numbered horizontal line of the RGB signal with the third horizontal resolution, and $c_0, c_1, c_2$ indicate coefficients of the first low pass filter corresponding to the red subpixels, respectively; the second low pass filter is expressed as follows:

$$G'_m = c_3 \times G_{(m*3)} + c_4 \times G_{(m*3+1)} + c_5 \times G_{(m*3+2)},$$

where $G'_m$ indicates a green pixel of the odd-numbered horizontal line of the RGB signal with the fourth horizontal resolution, $G_{(m*3)}$, $G_{(m*3+1)}$, $G_{(m*3+2)}$ indicate respective green subpixels of the three pixels of the odd-numbered horizontal line of the RGB signal with the third horizontal resolution, and $c_3, c_4, c_5$ indicate coefficients of the second low pass filter corresponding to the green subpixels, respectively; and the third low pass filter is expressed as follows:

$$B'_m = c_6 \times B_{(m*3-1)} + c_7 \times B_{(m*3+2)} + c_8 \times B_{(m*3+3)},$$

where $B'_m$ indicates a blue pixel of the odd-numbered horizontal line of the RGB signal with the fourth horizontal resolution, $B_{(m*3+1)}$, $B_{(m*3+2)}$, $B_{(m*3+3)}$ indicate respective blue subpixels of the three pixels of the odd-numbered horizontal line of the RGB signal with the third horizontal resolution, and $c_6, c_7, c_8$ indicate coefficients of the third low pass filter corresponding to the blue subpixels, respectively.

7. The apparatus as claimed in claim 4, wherein the even horizontal line low pass filtering mapper includes a fourth low pass filter, a fifth low pass filter, and a sixth low pass filter for performing a low pass filtering based on four pixels of each even-numbered horizontal line of the RGB signal with the third horizontal resolution to generate three pixels of the even-numbered horizontal line of the RGB signal with the fourth horizontal resolution.

8. The apparatus as claimed in claim 7, wherein the fourth low pass filter is expressed as follows:

$$R'_m = c_9 \times R_{(m*3)} + c_{10} \times R_{(m*3+1)} + c_{11} \times R_{(m*3+2)} + c_{12} \times R_{(m*3+3)},$$

where m is an integer, $R'_m$ indicates a red pixel of the even-numbered horizontal line of the RGB signal with the fourth horizontal resolution, $R_{m*3}$, $R_{(m*3+1)}$, $R_{(m*3+2)}$, $R_{(m*3+3)}$ indicate respective red subpixels of the four pixels of the even-numbered horizontal line of the RGB signal with the third horizontal resolution, and $c_9, c_{10}, c_{11}, c_{12}$ indicate coefficients of the fourth low pass filter corresponding to the red subpixels, respectively; the fifth low pass filter is expressed as follows:

$$G'_m = c_{13} \times G_{(m*3-2)} + c_{14} \times G_{(m*3-1)} + c_{15} \times G_{(m*3)} + c_{16} \times G_{(m*3+1)},$$

where $G'_m$ indicates a green pixel of the even-numbered horizontal line of the RGB signal with the fourth horizontal resolution, $G_{(m*3-2)}$, $G_{(m*3-1)}$, $G_{(m*3)}$, $G_{(m*3+1)}$ indicate respective green subpixels of the four pixels of the even-numbered horizontal line of the RGB signal with the third horizontal resolution, and $c_{13}, c_{14}, c_{15}, c_{16}$ indicate coefficients of the fifth low pass filter corresponding to the green subpixels, respectively; the sixth low pass filter is expressed as follows:

$$B'_m = c_{17} \times B_{(m*3-1)} + c_{18} \times B_{(m*3)} + c_{19} \times B_{(m*3+1)} + c_{20} \times B_{(m*3+2)},$$

where $B'_m$ indicates a blue pixel of the even-numbered horizontal line of the RGB signal with the fourth horizontal resolution, $B_{(m*3-1)}$, $B_{(m*3)}$, $B_{(m*3+1)}$, $B_{(m*3+2)}$ indicate respective blue subpixels of the four pixels of the even-numbered horizontal line of the RGB signal with the third horizontal resolution, and $c_{17}, c_{18}, c_{19}, c_{20}$ indicate coefficients of the sixth low pass filter corresponding to the blue subpixels, respectively.

9. The apparatus as claimed in claim 1, wherein the first YCrCb signal has a format of 720YCrCb444, 720YCrCb422, 640YCrCb444, or 640YCrCb422.

10. The apparatus as claimed in claim 9, wherein, when the first YCrCb signal is in the 720YCrCb444 or 720YCrCb422 format, the first one-dimension scaler is enabled and expressed as follows:

$$Y'_k = Y_{k/4*3},$$

$$Y'_{k+1} = 1/4 * Y_{(k/4*3)} + 3/4 * Y_{(k/4*3+1)},$$

$$Y'_{k+2} = 1/2 * Y_{(k/4*3+1)} + 1/2 * Y_{(k/4*3+2)},$$

$$Y'_{k+3} = 3/4 * Y_{(k/4*3+2)} + 1/4 * Y_{(k/4*3+3)},$$

where k is four times an integer, $Y_{k/4*3}$, $Y_{(k/4*3+1)}$, $Y_{(k/4*3+2)}$, $Y_{(k/4*3+3)}$ are lumas of the first YCrCb signal, and $Y'_k, Y'_{k+1}, Y'_{k+2}, Y'_{k+3}$ are lumas of the second YCrCb signal with the third horizontal resolution.

11. The apparatus as claimed in claim 10, wherein the first one-dimension scaler is further expressed as follows:

$$Cb'_k = Cb_{k/4*3},$$

$$Cb'_{k+1} = 1/4 * Cb_{(k/4*3)} + 3/4 * Cb_{(k/4*3+1)},$$

$$Cb'_{k+2} = 1/2 * Cb_{(k/4*3+1)} + 1/2 * Cb_{(k/4*3+2)},$$

$$Cb'_{k+3} = 3/4 * Cb_{(k/4*3+2)} + 1/4 * Cb_{(k/4*3+3)},$$

where k is four times an integer, $Cb_{k/4*3}$, $Cb_{(k/4*3+1)}$, $Cb_{(k/4*3+2)}$, $Cb_{(k/4*3+3)}$ are chromas of the first YCrCb signal, and $Cb'_k, Cb'_{k+1}, Cb'_{k+2}, Cb'_{k+3}$ are chromas of the second YCrCb signal with the third horizontal resolution; and $$Cr'_k = Y_{k/4*3},$$

$$Cr'_{k+1} = 1/4 * Cr_{(k/4*3)} + 3/4 * Cr_{(k/4*3+1)},$$

$$Cr'_{k+2} = 1/2 * Cr_{(k/4*3+1)} + 1/2 * Cr_{(k/4*3+2)},$$

and $$Cr'_{k+3} = 3/4 * Cr_{(k/4*3+2)} + 1/4 * Cr_{(k/4*3+3)},$$

where k is four times an integer, $Cr_{k/4*3}$, $Cr_{(k/4*3+1)}$, $Cr_{(k/4*3+2)}$, $Cr_{(k/4*3+3)}$ are chromas of the first YCrCb signal, and $Cr'_k$, $Cr'_{k+2}$, $Cr'_{k+3}$ are chromas of the second YCrCb signal with the third horizontal resolution.

12. The apparatus as claimed in claim 11, wherein, when the first YCrCb signal is in the 720YCrCb422 format, the first YCrCb signal includes chromas expressed by $Cb_{2*w}=Cb_{2*w+1}$ and $Cr_{2*w}=Cr_{2*w+1}$, where w is an integer and w≥0.

13. The apparatus as claimed in claim 9, wherein, when the first YCrCb signal is in the 640YCrCb444 or 640YCrCb422 format, the second one-dimension scaler is enabled and expressed as follows:

$$Y'_j = Y_{j/3*2},$$

$$Y'_{j+1} = 5/16 * Y_{(j/3*2)} + 11/16 * Y_{(j/3*2+1)},$$

and $$Y'_{j+2} = 11/16 * Y_{(j/3*2+1)} + 5/16 * Y_{(j/3*2+2)},$$

where j is three times an integer, $Y_{j/3*2}$, $Y_{(j/3*2+1)}$, $Y_{(j/3*2+2)}$ are lumas of the first YCrCb signal, and $Y'_j$, $Y'_{j+1}$, $Y'_{j+2}$ are lumas of the second YCrCb signal with the third horizontal resolution.

14. The apparatus as claimed in claim 13, wherein the second one-dimension scaler is further expressed as follows:

$$Cb'_j = Cb_{j/3*2},$$

$$Cb'_{j+1} = 5/16 * Cb_{(j/3*2)} + 11/16 * Cb_{(j/3*2+1)},$$

$$Cb'_{j+2} = 11/16 * Cb_{(j/3*2+1)} + 5/16 * Cb_{(j/3*2+2)},$$

where j is three times an integer, $Cb_{j/3*2}$, $Cb_{(j/3*2+1)}$, $Cb_{(j/3*2+2)}$ are chromas of the first YCrCb signal, and $Cb'_j$, $Cb'_{j+1}$, $Cb'_{j+2}$ are chromas of the second YCrCb signal with the third horizontal resolution; and $$Cr'_j = Cr_{j/3*2},$$

$$Cr'_{j+1} = 5/16 * Cr_{(j/3*2)} + 11/16 * Cr_{(j/3*2+1)},$$

and $$Cr'_{j+2} = 11/16 * Cr_{(j/3*2+1)} + 5/16 * Cr_{(j/3*2+2)},$$

where j is three times an integer, $Cr_{j/3*2}$, $Cr_{(j/3*2+1)}$, $Cr_{(j/3*2+2)}$ are chromas of the first YCrCb signal, and $Cr'_j$, $Cr'_{j+1}$, $Cr'_{j+2}$ are chromas of the second YCrCb signal with the third horizontal resolution.

15. The apparatus as claimed in claim 14, wherein, when the first YCrCb signal is in the 640YCrCb422 format, the first YCrCb signal includes chromas expressed by $Cb_{2*w}=Cb_{2*w+1}$ and $Cr_{2*w}=Cr_{2*w+1}$, where w is an integer and w≥0.

16. A pixel data conversion method for display with delta panel arrangement, comprising the steps of: (A) converting an input video signal from a Red, Green, and Blue (RGB) domain into a YCrCb domain so as to generate a first YCrCb signal;

(B) determining a horizontal resolution of the first YCrCb signal, and generating a first enable signal when the first YCrCb signal is a first horizontal resolution and a second enable signal when the first YCrCb signal is a second horizontal resolution;

(C) scaling the first YCrCb signal to generate a second YCrCb signal with a third horizontal resolution when the first enable signal is activated;

(D) scaling the first YCrCb signal to generate the second YCrCb signal with the third horizontal resolution when the second enable signal is activated;

(E) converting the second YCrCb signal with the third horizontal resolution into an RGB signal with the third horizontal resolution, wherein the RGB signal with the third horizontal resolution is in a strip panel arrangement with a resolution of 960RGB×480 that has 480 horizontal lines in one frame, wherein there are 960 pixels in each horizontal line and three subpixels in each pixel, including red, green, and blue subpixels; and (F) filtering and mapping the RGB signal with the third horizontal resolution into an RGB signal with a fourth horizontal resolution, wherein the RGB signal with the fourth horizontal resolution is in the delta panel arrangement with a resolution of 320RGB×480 that has 480 horizontal lines in one frame, and there are 960 pixels in each horizontal line, wherein each odd-numbered horizontal line arranged in a sequence of red, green, blue pixels and each even-numbered horizontal line arranged in a sequence of green, blue, red pixels repeatedly;

wherein a position of each pixel in an even-numbered horizontal line has a half-pixel dislocation to a position of each pixel in an odd-numbered horizontal line.

17. The method as claimed in claim 16, wherein step (F) comprises the steps of:

(F1) performing a first low pass filtering expressed by an equation as follows:

$$R'_m = c_0 \times R_{(m*3-1)} + c_1 \times R_{m*3} + c_2 \times R_{(m*3+1)},$$

where m is an integer, $R'_m$ indicates a red pixel of the odd-numbered horizontal line of the RGB signal with the fourth horizontal resolution, $R_{(m*3-1)}$, $R_{m*3}$, $R_{(m*3+1)}$ indicate respective red subpixels of three pixels of the odd-numbered horizontal line of the RGB signal with the third horizontal resolution, and $c_0$, $c_1$, $c_2$ indicate coefficients of the first low pass filter corresponding to the red subpixels, respectively;

(F2) performing a second low pass filtering expressed by an equation as follows:

$$G'_m = c_3 \times G_{(m*3)} + c_4 \times G_{(m*3+1)} + c_5 \times G_{(m*3+2)},$$

where $G'_m$ indicates a green pixel of the odd-numbered horizontal line of the RGB signal with the fourth horizontal resolution, $G_{(m*3)}$, $G_{(m*3+1)}$, $G_{(m*3+2)}$ indicate respective green subpixels of the three pixels of the odd-numbered horizontal line of the RGB signal with the third horizontal resolution, and $c_3$, $c_4$, $c_5$ indicate coefficients of the second low pass filter corresponding to the green subpixels, respectively; and (F3) performing a third low pass filtering expressed by an equation as follows:

$$B'_m = c_6 \times B_{(m*3-1)} + c_7 \times B_{(m*3+2)} + c_8 \times B_{(m*3+3)},$$

where $B'_m$ indicates a blue pixel of the odd-numbered horizontal line of the RGB signal with the fourth horizontal resolution, $B_{(m*3+1)}$, $B_{(m*3+2)}$, $B_{(m*3+3)}$ indicate respective blue subpixels of the three pixels of the odd-numbered horizontal line of the RGB signal with the third horizontal resolution, and $c_6$, $c_7$, $c_8$ indicate coefficients of the third low pass filter corresponding to the blue subpixels, respectively.

18. The method as claimed in claim 17, wherein step (F) further comprises the steps of:

(F4) performing a fourth low pass filtering expressed by an equation as follows:

$$R'_m = c_9 \times R_{(m*3)} + c_{10} \times R_{(m*3+1)} + c_{11} \times R_{(m*3+2)} + c_{12} \times R_{(m*3+3)},$$

where m is an integer, $R'_m$ indicates a red pixel of the even-numbered horizontal line of the RGB signal with the fourth horizontal resolution, $R_{m*3}$, $R_{(m*3+1)}$ $R_{(m*3+2)}$, $R_{(m*3+3)}$ indicate respective red subpixels of four pixels of the even-numbered horizontal line of the RGB signal with the third horizontal resolution, and $c_9$, $c_{10}$, $c_{11}$, $c_{12}$ indicate coefficients of the fourth low pass filter corresponding to the red subpixels, respectively;

(F5) performing a fifth low pass filtering expressed by an equation as follows:

$$G'_m = c_{13} \times G_{(m*3-2)} + c_{14} \times G_{(m*3-1)} + c_{15} \times G_{(m*3)} + c_{16} \times G_{(m*3+1)},$$

where $G'_m$ indicates a green pixel of the even-numbered horizontal line of the RGB signal with the fourth horizontal resolution, $G_{(m*3-2)}$, $G_{(m*3-1)}$, $G_{(m*3)}$, $G_{(m*3+1)}$ indicate respective green subpixels of the four pixels of the even-numbered horizontal line of the RGB signal with the third horizontal resolution, and $c_{13}$, $c_{14}$, $c_{15}$, $c_{16}$ indicate coefficients of the fifth low pass filter corresponding to the green subpixels, respectively; and (F6) performing a sixth low pass filtering expressed by an equation as follows:

$$B'_m = c_{17} \times B_{(m*3-1)} + c_{18} \times B_{(m*3)} + c_{19} \times B_{(m*3+1)} + c_{20} \times B_{(m*3+2)},$$

where $B'_m$ indicates a blue pixel of the even-numbered horizontal line of the RGB signal with the fourth horizontal resolution, $B_{(m*3-1)}$, $B_{(m*3)}$, $B_{(m*3+1)}$, $B_{(m*3+2)}$ indicate respective blue subpixels of the four pixels of the even-numbered horizontal line of the RGB signal with the third horizontal resolution, and $c_{17}$, $c_{18}$, $c_{19}$, $c_{20}$ indicate coefficients of the sixth low pass filter corresponding to the blue subpixels, respectively.

19. The method as claimed in claim 16, wherein the first YCrCb signal has a format of 720YCrCb444, 720YCrCb422, 640YCrCb444, or 640YCrCb422.

20. The method as claimed in claim 19, wherein, when the first YCrCb signal is in the 720YCrCb444 or 720YCrCb422 format, the scaling in step (C) is expressed as follows:

$$Y'_k = Y_{k/4*3},$$

$$Y'_{k+1} = 1/4*Y_{(k/4*3)} + 3/4*Y_{(k/4*3+1)},$$

$$Y'_{k+2} = 1/2*Y_{(k/4*3+1)} + 1/2*Y_{(k/4*3+2)},$$

and $$Y'_{k+3} = 3/4*Y_{(k/4*3+2)} + 1/4*Y_{(k/4*3+3)},$$

where k is four times an integer, $Y_{k/4*3}$, $Y_{(k/4*3+1)}$, $Y_{(k/4*3+2)}$, $Y_{(k/4*3+3)}$ are lumas of the first YCrCb signal, and $Y'_k$, $Y'_{k+1}$, $Y'_{k+2}$, $Y'_{k+3}$ are lumas of the second YCrCb signal with the third horizontal resolution;

$$Cb'_k = Cb_{k/4*3},$$

$$Cb'_{k+1} = 1/4*Cb_{(k/4*3)} + 3/4*Cb_{(k/4*3+1)},$$

$$Cb'_{k+2} = 1/2*Cb_{(k/4*3+1)} + 1/2*Cb_{(k/4*3+2)},$$

and $$Cb'_{k+3} = 3/4*Cb_{(k/4*3+2)} + 1/4*Cb_{(k/4*3+3)},$$

where k is four times an integer, $Cb_{k/4*3}$, $Cb_{(k/4*3+1)}$, $Cb_{(k/4*3+2)}$, $Cb_{(k/4*3+3)}$ are chromas of the first YCrCb signal, and $Cb'_k$, $Cb'_{k+1}$, $Cb'_{k+2}$, $Cb'_{k+3}$ are chromas of the second YCrCb signal with the third horizontal resolution; and $$Cr'_k = Cr_{k/4*3},$$

$$Cr'_{k+1} = 1/4*Cr_{(k/4*3)} + 3/4*Cr_{(k/4*3+1)},$$

$$Cr'_{k+2} = 1/2*Cr_{(k/4*3+1)} + 1/2*Cr_{(k/4*3+2)},$$

$$Cr'_{k+3} = 3/4*Cr_{(k/4*3+2)} + 1/4*Cr_{(k/4*3+3)},$$

where k is four times an integer, $Cr_{k/4*3}$, $Cr_{(k/4*3+1)}$, $Cr_{(k/4*3+2)}$, $Cr_{(k/4*3+3)}$ are chromas of the first YCrCb signal, and $Cr'_k$, $Cr'_{k+1}$, $Cr'_{k+2}$, $Cr'_{k+3}$ are chromas of the second YCrCb signal with the third horizontal resolution.

21. The method as claimed in claim 20, wherein, when the first YCrCb signal is in the 720YCrCb422 format, the first YCrCb signal includes chromas expressed by $Cb_{2*w} = Cb_{2*w+1}$ and $Cr_{2*w} = Cr_{2*w+1}$, where w is an integer and $w \geq 0$.

22. The method as claimed in claim 19, wherein, when the first YCrCb signal is in the 640YCrCb444 or 640YCrCb422 format, the scaling in step (D) is expressed as follows:

$$Y'_j = Y_{j/3*2},$$

$$Y'_{j+1} = 5/16*Y_{(j/3*2)} + 11/16*Y_{(j/3*2+1)},$$

$$Y'_{j+2} = 11/16*Y_{(j/3*2+1)} + 5/16*Y_{(j/3*2+2)},$$

where j is three times an integer, $Y_{j/3*2}$, $Y_{(j/3*2+1)}$, $Y_{(j/3*2+2)}$ are lumas of the first YCrCb signal, and $Y'_j$, $Y'_{j+1}$, $Y'_{j+2}$ are lumas of the second YCrCb signal with the third horizontal resolution;

$$Cb'_j = Cb_{j/3*2},$$

$$Cb'_{j+1} = 5/16*Cb_{(j/3*2)} + 11/16*Cb_{(j/3*2+1)},$$

$$Cb'_{j+2} = 11/16*Cb_{(j/3*2+1)} + 5/16*Cb_{(j/3*2+2)},$$

where j is three times an integer, $Cb_{j/3*2}$, $Cb_{(j/3*2+1)}$, $Cb_{(j/3*2+2)}$ are chromas of the first YCrCb signal, and $Cb'_j$, $Cb'_{j+1}$, $Cb'_{j+2}$ are chromas of the second YCrCb signal with the third horizontal resolution; and $$Cr'_j = Cr_{j/3*2},$$

$$Cr'_{j+1} = 5/16*Cr_{(j/3*2)} + 11/16*Cr_{(j/3*2+1)},$$

$$Cr'_{j+2} = 11/16*Cr_{(j/3*2+1)} + 5/16*Cr_{(j/3*2+2)},$$

where j is three times an integer, $Cr_{j/3*2}$, $Cr_{(j/3*2+1)}$, $Cr_{(j/3*2+2)}$ are chromas of the first YCrCb signal, and $Cr'_j$, $Cr'_{j+1}$, $Cr'_{j+2}$ are chromas of the second YCrCb signal with the third horizontal resolution.

23. The method as claimed in claim 22, wherein, when the first YCrCb signal is in the 640YCrCb422 format, the first YCrCb signal includes chromas expressed by $Cb_{2*w} = Cb_{2*w+1}$ and $Cr_{2*w} = Cr_{2*w+1}$ where w is an integer and $w \geq 0$.

* * * * *